(12) United States Patent
Srivastava et al.

(10) Patent No.: US 12,730,663 B2
(45) Date of Patent: Sep. 8, 2026

(54) VIRTUAL DATA LINKS

(71) Applicant: QUALCOMM INCORPORATED, San Diego, CA (US)

(72) Inventors: Prakhar Srivastava, Lucknow (IN); Santhosh Reddy Akavaram, Hyderabad (IN); Ravindranath Doddi, Hyderabad (IN); Radhakrishna Mugada, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 571 days.

(21) Appl. No.: 18/303,101

(22) Filed: Apr. 19, 2023

(65) Prior Publication Data

US 2024/0354141 A1 Oct. 24, 2024

(51) Int. Cl.
*G06F 9/455* (2018.01)
*G06F 13/42* (2006.01)

(52) U.S. Cl.
CPC ...... *G06F 9/45558* (2013.01); *G06F 13/4221* (2013.01); *G06F 2009/45579* (2013.01); *G06F 2009/45595* (2013.01)

(58) Field of Classification Search
CPC ............. G06F 9/45558; G06F 13/4221; G06F 2009/45579; G06F 2009/45595; G06F 13/105
See application file for complete search history.

(56) References Cited

U.S. PATENT DOCUMENTS

| | | | | |
|---|---|---|---|---|
| 2008/0052431 | A1 | 2/2008 | Freking et al. | |
| 2010/0165874 | A1 | 7/2010 | Brown et al. | |
| 2011/0087820 | A1 | 4/2011 | Norden | |
| 2020/0042350 | A1* | 2/2020 | Deval | G06F 9/45558 |
| 2020/0136996 | A1* | 4/2020 | Li | H04L 47/125 |
| 2020/0174923 | A1* | 6/2020 | Bhattiprolu | G06F 12/1081 |
| 2021/0360319 | A1* | 11/2021 | Chari | H04L 12/2869 |
| 2021/0382737 | A1* | 12/2021 | Cheng | G06F 9/45558 |
| 2022/0309014 | A1* | 9/2022 | Jeon | G06F 13/28 |
| 2023/0244515 | A1* | 8/2023 | Shah | G06F 8/457 718/1 |
| 2023/0289229 | A1* | 9/2023 | Kakaiya | G06F 21/74 |
| 2023/0341889 | A1* | 10/2023 | Elliott | G06F 1/14 |

OTHER PUBLICATIONS

International Search Report (ISR) and Written Opinion by ISA (=EPO) of related PCT Pat. App. No. PCT/US2024/019238, filed on Mar. 8, 2024, entitled, “Virtual Data Links,” report transmitted on Jul. 10, 2024, ten pages.

* cited by examiner

*Primary Examiner* — Dong U Kim
(74) *Attorney, Agent, or Firm* — Smith Tempel Blaha LLC

(57) ABSTRACT

A multi-lane data communication link, such as a PCIe link, may be configured as virtual links. Each virtual link may correspond to a unique subset of the lanes. Data packets provided by multiple virtual machines and associated virtual functions may be buffered in transmit queues. Each transmit queue may correspond to a unique one of the virtual links. The data may be provided from each of the transmit queues to data transmitting circuitry coupled to active lanes.

22 Claims, 16 Drawing Sheets

200
202
202A
202B
202M
1st VM
2nd VM
Mth VM
204
204A
204B
204M
1st VF
2nd VF
Mth VF
205
207
209
211
206
208
210
212
214
1st VF data
4th VF data
2nd VF data
xth VF data
Earliest
Latest
216
216A
216B
216N
218
RX Queue
220
222
222A
222B
222M
Processing Logic 506
508
502
504
504A
504B
504C
504D
502A
502B
502C
502D
502E
502F
502G
502H
507

800

| b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|
| (not used) | | | | | | | priority level | | | m = number of VLs | | | | | VL_en |

FIG. 8

VIRTUAL DATA LINKS

DESCRIPTION OF THE RELATED ART

A computing device may include multiple processing subsystems, such as central processing units ("CPU"s), graphics processing units ("GPU"s), digital signal processors ("DSP"s), and neural processing units ("NPU"s). The multiple processors or subsystems may be integrated on a "system-on-a-chip" ("SoC") or in separate chips. The SoC or other chips of the computing device may also include multiple peripherals or resources, such as memory devices, input/output ("I/O") devices, etc. A processor or subsystem may be coupled to some peripherals or resources by a data communication link.

Peripheral Component Interconnect Express ("PCIe") is a specification for a data communication link between devices, such as between a (host) processing system and one or more endpoint devices (e.g., peripheral devices, memory devices, or other resources). A PCIe link may have multiple lanes, such as up to 16 lanes. In a multi-lane link, successive bytes of data may be striped across the lanes.

PCIe is essentially a point-to-point specification, meaning that a single host processing system may be coupled to a single endpoint device, although a host processing system may be coupled to multiple endpoint devices through a hub or switch. Single-Root I/O Virtualization ("SRIOV") is an extension to PCIe that enables different "virtual machines" or "VM"s to share a single PCIe hardware interface. A host processing system may be configured into multiple VMs. SRIOV provides for the creation of physical functions ("PFs") and virtual functions ("VFs"). A physical function may provide an interface to features of the PCIe hardware. Multiple VFs may be associated with each PF. The VFs may then be associated with the VMs. Each VM with which a particular VF has been associated may access that VF as though that VF were the PCIe hardware interface. When a VM requests an I/O transaction with a particular VF, the VF operates through the associated PF to perform the I/O operation and return the response to that VF. In this manner, an endpoint device may be shared among multiple VMs.

In SRIOV, data transfers initiated by each VF are sent through the PCIe link serially. When the link is processing packets currently being provided by one VF, packets being provided by other VFs are delayed until the current VF's packet transmission through the link is complete. This may increase response time for other VFs and degrade the user experience when multiple applications are sharing the same endpoint device.

SUMMARY OF THE DISCLOSURE

Systems, methods, devices, and other examples are disclosed for transferring data over a link.

An exemplary method for transferring data over a link may include buffering in a plurality of transmit queues data packets provided by each of a plurality of transmitting components. Each transmit queue may correspond to one of a plurality of virtual links. Each virtual link may have a virtual linkwidth equal to a width of a portion of a plurality of active lanes uniquely corresponding to that virtual link. The method may also include providing data from each of the transmit queues to data transmitting circuitry coupled to the lanes.

An exemplary system for transferring data over a link may include a plurality of transmit queues, transmit queue routing circuitry, and transmit queue reading circuitry. Each transmit queue may correspond to one of a plurality of virtual links. Each virtual link may have a virtual linkwidth equal to a width of a portion of a plurality of active lanes uniquely corresponding to the virtual link. The transmit queue routing circuitry may be configured to buffer in the transmit queues data packets received from a plurality of transmitting components. The transmit queue reading circuitry may be configured to provide data from each of the transmit queues to data transmitting circuitry coupled to the lanes.

Another exemplary system for transferring data over a link may include means for buffering data packets provided by each of a plurality of transmitting components in one of a plurality of transmit queues. Each transmit queue may correspond to one of a plurality of virtual links. Each virtual link may have a virtual linkwidth equal to a width of a portion of a plurality of active lanes uniquely corresponding to the virtual link. The system may also comprise means for providing data from each of the transmit queues to data transmitting circuitry coupled to the lanes.

An exemplary system for transferring data over a Peripheral Component Interconnect Express (PCIe) link may include a plurality of transmit queues in a PCIe root complex of a host processing system. Each transmit queue may correspond to one of a plurality of virtual links. Each virtual link may have a virtual linkwidth equal to a width of a portion of a plurality of active lanes of the PCIe link uniquely corresponding to the virtual link. The PCIe link may be configured in Single-Root Input/Output Virtualization (SRIOV). The system may also include transmit queue routing circuitry in the PCIe root complex configured to buffer in the transmit queues data packets received from a plurality of virtual machines of the host processing system. The system may further include transmit queue reading circuitry in the PCIe root complex configured to provide data from each of the transmit queues to data transmitting circuitry coupled to the lanes.

BRIEF DESCRIPTION OF THE DRAWINGS

In the Figures, like reference numerals refer to like parts throughout the various views unless otherwise indicated. For reference numerals with letter character designations such as "101A" or "101B", the letter character designations may differentiate two like parts or elements present in the same Figure. Letter character designations for reference numerals may be omitted when it is intended that a reference numeral to encompass all parts having the same reference numeral in all Figures.

FIG. 8 illustrates a virtual link control register, in accordance with exemplary embodiments.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
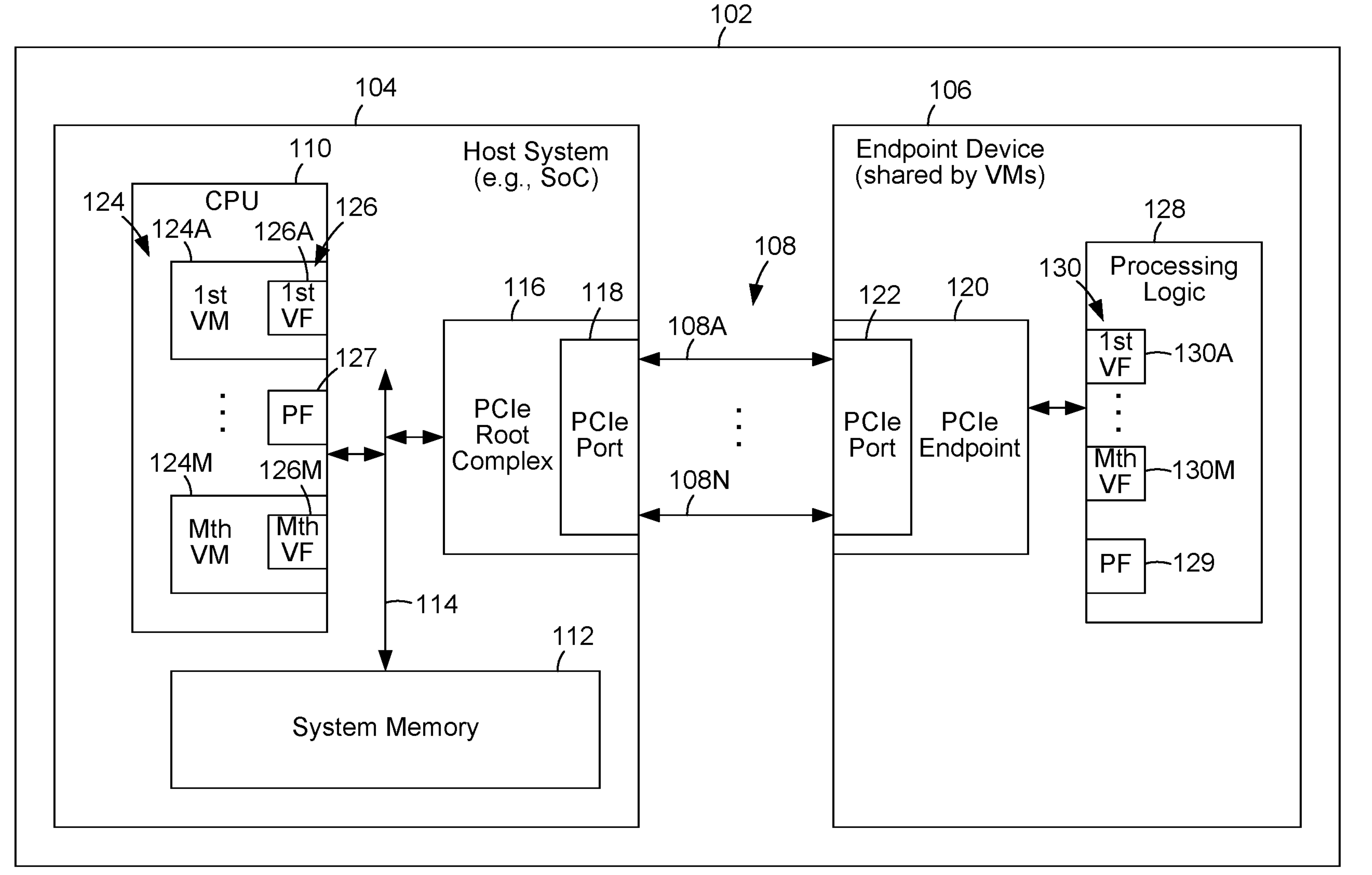
FIG. 1 is a block diagram of a system for transmitting data over a Peripheral Component Interconnect Express ("PCIe") link configured in Single-Root I/O Virtualization ("SRIOV"), in accordance with exemplary embodiments.

As shown in FIG. 1, in an illustrative or exemplary embodiment a computing device 102 may include a host system 104 and an endpoint device 106 configured to communicate data with each other over a Peripheral Component Interconnect Express ("PCIe") link 108. The PCIe link 108 may have any number (N) of lanes 108A-108N. In one example, the PCIe link 108 may have four lanes 108A-108N, while in another example, the PCIe link 108 may have eight lanes 108A-108N, and in still another example the PCI link 108 may have 16 lanes 108A-108N, etc. Each of the lanes 108A-108N may be bidirectional, comprising two pairs of signal conductors (not shown). The device 102 may be, for example, a laptop or desktop computer, a mobile phone, a gaming device, an internet-of-things device, an automotive computing system, or any other type of computing device.

The host system 104 may be, for example, a system-on-a-chip ("SoC") having a CPU 110, other processing subsystems (not shown), a system memory 112, etc., interconnected by a system bus or data interconnect 114. A PCIe root complex 116 may also be coupled to the system bus 114. The PCIe root complex 116 may comprise circuitry/logic configured to generate transaction requests on behalf of the CPU 110. Although shown in FIG. 1 for purposes of clarity as a distinct or independent component from the CPU 110, some aspects of the PCIe root complex 116 may be integrated into the CPU functionality, i.e., performed through execution of software by the CPU 110. The PCIe root complex 116 may include at least one PCIe port 118, which is electrically coupled to the lanes 108A-108N of the PCIe link 108.

The endpoint device 106 may be any resource that is configurable to respond to transaction requests initiated by the host system 104 over the PCIe link 108. Accordingly, the endpoint device 106 may include circuitry/logic commonly referred to as a PCIe endpoint 120. The PCIe endpoint 120 may include at least one PCIe port 122, which is electrically coupled to the lanes 108A-108N of the PCIe bus 108. The PCIe endpoint 120 may comprise circuitry/logic configured to complete and otherwise respond to the CPU's transaction requests received over the PCIe link 108. In some examples, the endpoint device 106 may be a memory device or system, such as a dynamic random access memory ("DRAM") or a flash memory. In other examples, the endpoint device 106 may be another type of subsystem of the computing device 102, such as a wireless communication transceiver subsystem, also referred to as a modem subsystem.

In accordance with principles of Single-Root I/O Virtualization ("SRIOV"), the CPU 110 may be configured into a number (M) of virtual machines ("VM"s) 124, such as a first VM 124A through an Mth VM 124M. SRIOV is not described in detail herein. Nevertheless, it may be appreciated that SRIOV may enable the multiple VMs 124 to share access to the endpoint device 106. Although not shown in FIG. 1 for purposes of clarity, a PCIe control domain, also referred to as a Virtual System Interface ("VSI"), may be utilized (e.g., as kernel-level software executed by the CPU 110) that provides various SRIOV control functionality. For example, the VSI may control one or more physical functions or "PF"s 127 that provide interfaces to hardware features of the PCIe root complex 116. The VSI may also control one or more virtual functions or "VF"s 126. Multiple VFs 126 may be associated with each PF 127. The VFs 126 may be associated with the VMs 124. For example, each of a first VF 126A through an Mth VF 126M may be associated with corresponding VMs 124A-124M. In the example illustrated in FIG. 1, all VMs 124 have only one common associated PF 127, because in the illustrated example there is only one endpoint device 106 being shared among the VMs 124. Also, each VM 124 has only one associated VF 126 because in the illustrated example there is only one endpoint device 106 being shared among the VMs 124. In other examples (not shown), all VMs could have multiple, commonly associated PFs and hence each VM could have multiple VFs associated with it, and the VMs could share access to multiple endpoint devices. In the illustrated example, each VM 124 may access the associated (by the PF 127) underlying features of the PCIe root complex 116 through that VM's associated VF 126.

The endpoint device 106 similarly may include processing circuitry/logic 128 with a PF 129 and multiple VFs 130, such as a first VF 130A through an Mth VF 130M. When a VM 124 requests a transaction with the endpoint device 106 using that VM's associated VF 126, the associated VF 126 generates the one or more transaction data packets, controls the sending of the data packets over the PCIe link 108, and receives the response (data packets). In connection with generating data packets to be transmitted to the endpoint device 106, each VM 124 (or a VM 124 in combination with its associated VF 126) may also be referred to as a transmitting component.

Figure 2:
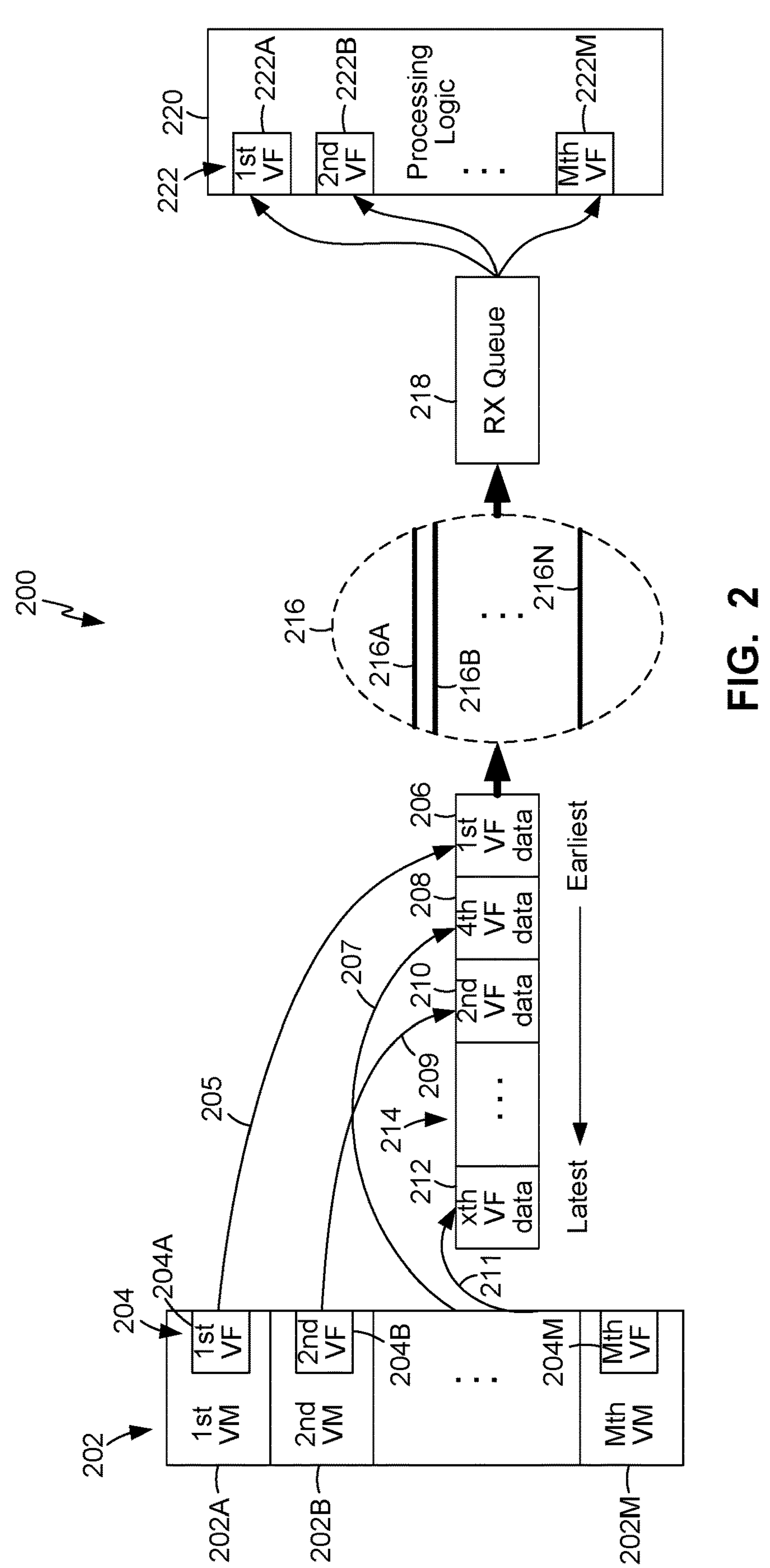
FIG. 2 illustrates an example of operation of a system in which data packets produced by one virtual function are not transmitted until data packets produced by another virtual function have been transmitted over the PCIe link.

In FIG. 2, operation of a system 200 in accordance with SRIOV principles is shown. The system 200 does not include the virtual link feature described further below. For purposes of clarity in describing an example of operation of the system 200, portions of the system 200 may be shown in a more conceptual form than the corresponding portions are shown in FIG. 1. In the system 200, a first VM 202A, a second VM 202B, etc., through an Mth VM 202M (collectively, VMs 202) may include, or have associated with them, a first VF 204A, a second VF 204B, etc., through an Mth VF 204M (collectively, VFs 204). The VMs 202 and VFs 204 may be in a host system (not shown in FIG. 2 for purposes of clarity).

In the example of operation shown in FIG. 2, the first VM 202A, through its associated VF 204A, requests a transaction with an endpoint device (not shown for purposes of clarity). In furtherance of this first transaction request, the first VF 204A produces (as indicated by an arrow 205) one or more data packets 206 ("1st VF data") and provides the one or more data packets 206 to a transmit ("TX") data buffer or TX queue 214. Although a root complex is not shown in the system 200 for purposes of clarity, the TX queue 214 may be in the root complex. Then, a fourth one of the VMs 202 (not separately shown), through its associated VF 204 (not separately shown), also requests a transaction with the endpoint device. In furtherance of this second transaction request, the fourth VF 204 produces (as indicated by an arrow 207) one or more data packets 208 ("4th VF data") and provides the one or more data packets 208 to the TX queue 214. Next, the second VM 202B, through its associated VF 204B, also requests a transaction with the endpoint device. In furtherance of this third transaction request, the second VF 204B produces (as indicated by an arrow 209) one or more data packets 210 ("2nd VF data") and provides the one or more data packets 210 to the TX queue 214. There may be any number of such transaction requests by various VMs 202, with the latest (in time) transaction request in the illustrated example being an xth transaction request, in which one or more data packets 212 ("xth VF data") have been produced (as indicated by an arrow 211) and provided to the TX queue 214.

In the example of operation illustrated in FIG. 2, the data packets in the TX queue 214 associated with a transaction initiated later relative to another transaction are not transmitted to the endpoint device over the PCIe link 216 until the data packets in the TX queue 214 associated with the earlier transaction have been transmitted to the endpoint device over the PCIe link 216. That is, the order in which data packets in the TX queue 214 are transmitted corresponds to the order in which the data packets were placed in the TX queue 214 by the VFs 204 per transaction. The endpoint device is not explicitly shown in FIG. 2 for purposes of clarity but may include a receive ("RX") buffer or RX queue 218 and processing circuitry/logic 220. The data packets may be received at the endpoint device into the RX queue 218 and then provided to corresponding VFs 222 of the processing circuitry/logic 220. Note that the VFs 222 at the endpoint device correspond to the VFs 204 at the host system. That is, a first VF 222A at the endpoint device corresponds to the first VF 204A at the host system, a second VF 222B at the endpoint device corresponds to the second VF 204B at the host system, etc., through an Mth VF 222M at the endpoint device that corresponds to the Mth VF 204M at the host system.

In the illustrated example, a group of one or more data packets produced by the first VF 204A at the host system (i.e., the "1st VF data") is transmitted from the TX queue 214 over the PCIe link 216 and is received by the first VF 222A at the endpoint device. Then, after the group of one or more data packets produced by the first VF 204A has been transmitted, the group of one or more data packets produced by the fourth one of the VF 204*s* (not separately shown) at the host system (i.e., the "4th VF data") is transmitted from the TX queue 214 over the PCIe link 216 and is received by a fourth one of the VFs 222 at the endpoint device. Then, after the group of one or more data packets produced by the fourth VF 204 at the host system has been transmitted, the group of one or more data packets produced by the second VF 204B at the host system (i.e., the "2nd VF data") is transmitted from the TX queue 214 over the PCIe link 216 and is received by the second VF 222B at the endpoint device.

It may be appreciated from the foregoing example of operation of the system 200 that, when an endpoint device is shared by multiple VFs 204, a group of data packets produced by one of the VFs 204 later in time is delayed in the TX queue 214 from being transmitted to the endpoint device until a group of data packets produced by another of the VFs 204 earlier in time has been transmitted to the endpoint device. A data packet produced by one of the VFs 204 in the TX queue 214 may be transmitted by striping successive bytes of the data packet across all lanes 216A. 216B, etc., through 216N of the PCIe link 216, but all bytes of that data packet are transmitted before any bytes of a data packet produced by another one of the VFs 204 in the TX queue 213 are transmitted. It may be appreciated that transmitting groups of data packets in the order they are placed in the TX queue 214 by the VFs 204 may increase the amount of time for some VFs 204 to receive responses from the endpoint device. For example, the transmission of very large data packets produced by one VF 204 may delay the transmission of smaller data packets produced by other VFs 204.

As described below in accordance with exemplary solutions, data produced by various VMs may be distributed more evenly over the available link bandwidth using a feature referred to herein as virtual links. In accordance with one aspect, the linkwidths of virtual links may be selected, based on, for example, throughput requirements. In accordance with another aspect, virtual links may be associated with priorities, and the transmission of data produced by one VM may be prioritized with respect to the transmission of data produced by another VM.

Some PCIe systems provide a low-power state, L0p, in which some subset of the lanes of a link are inactive, i.e., electrically idle, and all data transmission occurs on the remaining, active lanes of the link. In other words, some lanes are inactive while data packets produced by one VF are being transmitted and data packets produced by other VFs are waiting to be transmitted. In accordance with another aspect of the exemplary solutions described herein, inactive lanes may be powered up when transmission of a group of data packets produced by a VF is delayed while transmission of a group of data packets produced by another VF is utilizing all then-active lanes.

Figure 3:
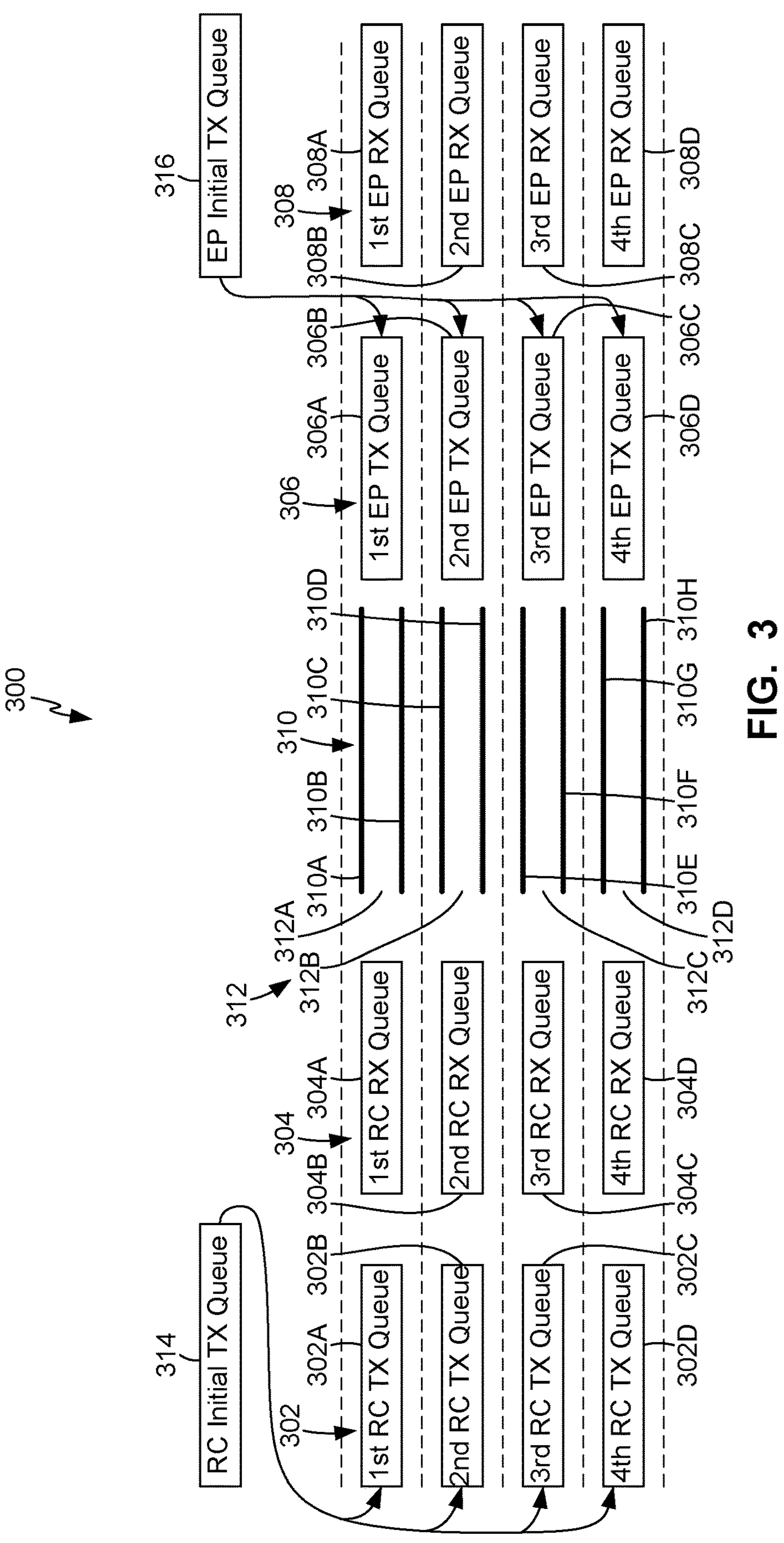
FIG. 3 is a block diagram showing transmit and receive queues corresponding to virtual links, in accordance with exemplary embodiments.

In FIG. 3, a system 300 may include root complex ("RC") virtual link ("VL") TX queues, 302, RC VL RX queues 304, endpoint ("EP") VL TX queues 306, and EP VL RX queues 308. The system 300 may further include a PCIe link. In the illustrated example, the PCIe link consists of eight lanes 310A, 310B, 310C, 310D, 310E, 310F. 310G and 310H (collectively, lanes 310). Nevertheless, in other examples there may be any number (n) of lanes, such as two, four, 16, 32, etc. The number of lanes (n) may also be referred to as the actual (i.e., non-virtual) linkwidth. In the illustrated example, the system 300 is configured for four virtual links ("VL"s): a first VL 312A consisting of (or corresponding to)

the lanes 310A and 310B; a second VL 312B consisting of (or corresponding to) the lanes 310C and 310D; a third VL 312C consisting of (or corresponding to) the lanes 310E and 310F; and a fourth VL 312D consisting of (or corresponding to) the lanes 310G and 310H. Stated another way, each of the VLs 312 may correspond to a unique subset of the set of lanes 310.

Each of the VLs 312 may be mapped to, i.e., may correspond to, one of the RC VL TX queues 302 and one of the EP VL TX queues 306. Each of the VLs 312 also may be mapped to, i.e., may correspond to, one of the RC VL RX queues 304 and one of the EP VL RX queues 308. In the illustrated example: the first VL 312A corresponds to the first RC VL TX queue 302A, the first RC VL RX queue 304A, the first EP VL TX queue 306A, and the first EP VL RX queue 308A; the second VL 312B corresponds to the second RC VL TX queue 302B, the second RC VL RX queue 304B, the second EP VL TX queue 306B, and the second EP VL RX queue 308B; the third VL 312C corresponds to the third RC VL TX queue 302C, the third RC VL RX queue 304C, the third EP VL TX queue 306C, and the third EP VL RX queue 308C; and the fourth VL 312D corresponds to the fourth RC VL TX queue 302D, the fourth RC VL RX queue 304D, the fourth EP VL TX queue 306D, and the fourth EP VL RX queue 308D. Boundaries of the VLs 312 and the foregoing correspondences are conceptually indicated in broken line. Broken line is similarly used throughout the figures to indicate boundaries between VLs.

In the system 300, there are eight lanes 310, organized or configured as four VLs 312, and thus each VL 312 has a virtual linkwidth of two. That is, each VL 312 in the illustrated example consists of two of the lanes 310. More generally, there may be any even number of lanes in a system, and in a system consisting of some number (n) of lanes, organized or configured as some number (m) of VLs, each VL may have a virtual linkwidth of n/m.

The RC VL TX queues 302 may be provided with data from an RC initial TX queue 314. Similarly, the EP VL TX queues 306 may be provided with data from an EP initial TX queue 316. The RC initial TX queue 314 and EP initial TX queue 316 may be similar to the above-described TX queue 214 (FIG. 2). For example, the RC initial TX queue 314 may receive data packets from host system VFs (not shown in FIG. 3).

Figure 4:
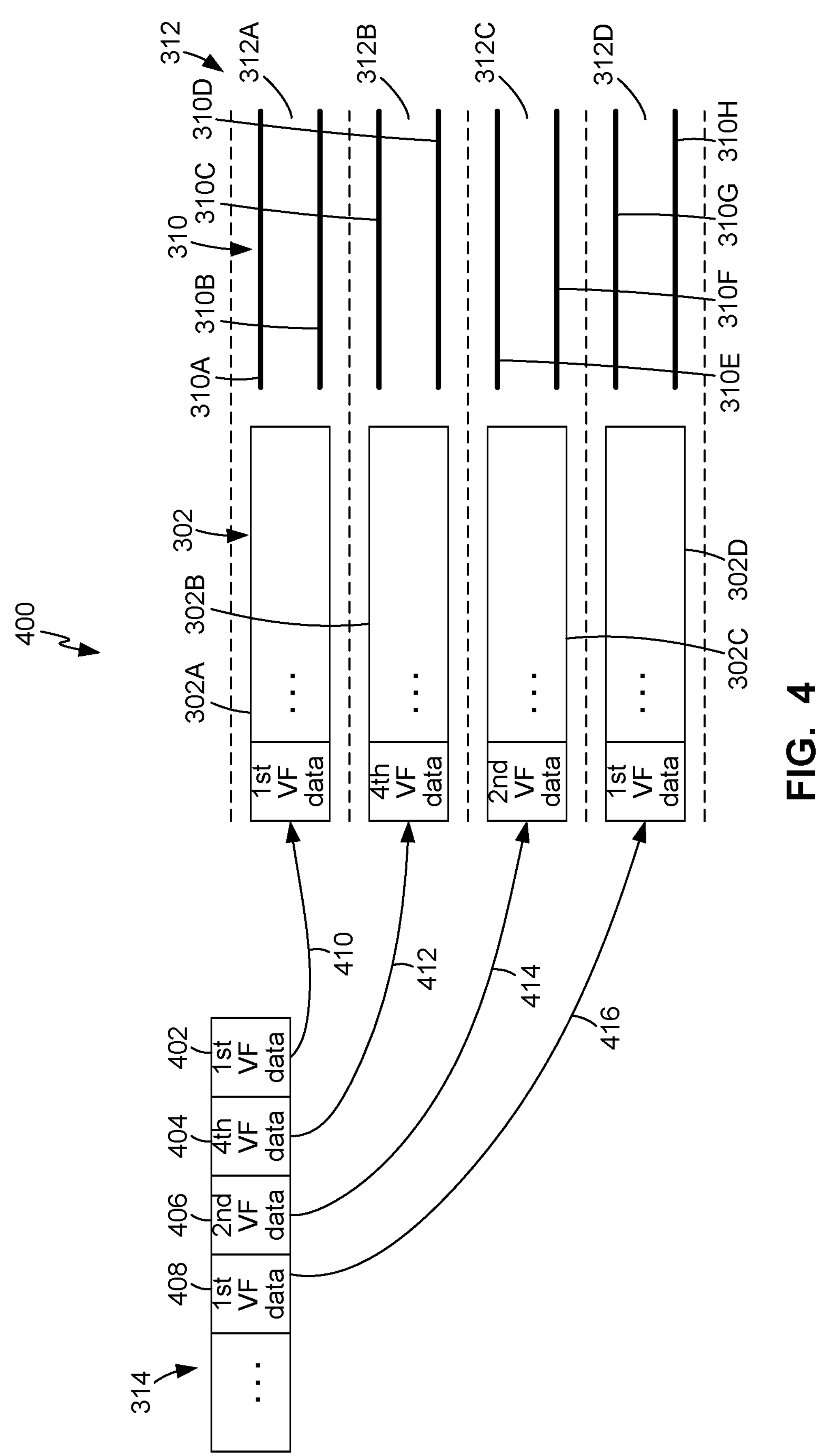
FIG. 4 illustrates an example of operation of a system using virtual links, in accordance with exemplary embodiments.

In FIG. 4, an example of operation of a system 400 is shown using the exemplary configuration described above with regard to FIG. 3 of a PCIe link, in which eight lanes 310 are configured as four VLs 312. The VLs 312A, 312B, 312C, and 312D are mapped to, or correspond to, the RC VL TX queues 302A, 302B, 302C and 302D, respectively. In the example shown in FIG. 4: a group of one or more data packets 402 ("1 st VF data") have been provided to the RC initial TX queue 314 by a first VF (not shown in FIG. 4); a group of one or more data packets 404 ("4th VF data") have been provided to the RC initial TX queue 314 by a fourth VF (not shown in FIG. 4); a group of one or more data packets 406 ("2nd VF data") have been provided to the RC initial TX queue 314 by a second VF (not shown in FIG. 4); and a group of one or more data packets 408 ("1st VF data") have been provided to the RC initial TX queue 314 by the first VF. Although the VFs are not shown in FIG. 4 for purposes of clarity, the VFs may be similar to the VFs 204 described above with regard to FIG. 2.

Then, as indicated by the arrows 410-416, the groups of data packets 402-408 may be transferred from the RC initial TX queue 314 to the RC VL TX queues 302. Note in this example that the groups of data packets 402-408 provided by the various VFs are distributed among the RC TX queues 302. More specifically: the group of one or more data packets 402 provided by the first VF are buffered in the RC VL TX queue 302A, as indicated by the arrow 410; the group of one or more data packets 404 provided by the fourth VF are buffered in the RC VL TX queue 302B, as indicated by the arrow 412; the group of one or more data packets 406 provided by the second VF are buffered in the RC TX queue 302C, as indicated by the arrow 414; and the group of one or more one or more data packets 408 provided again by the first VF are buffered in the RC VL TX queue 302D, as indicated by the arrow 416. Although only four groups of data packets 402-408 are shown in this example, further groups of data packets that may subsequently be provided to the RC initial TX queue 314 may be buffered in the same manner, i.e., distributing the further groups of data packets among the RC VL TX queues 302.

Figure 5:
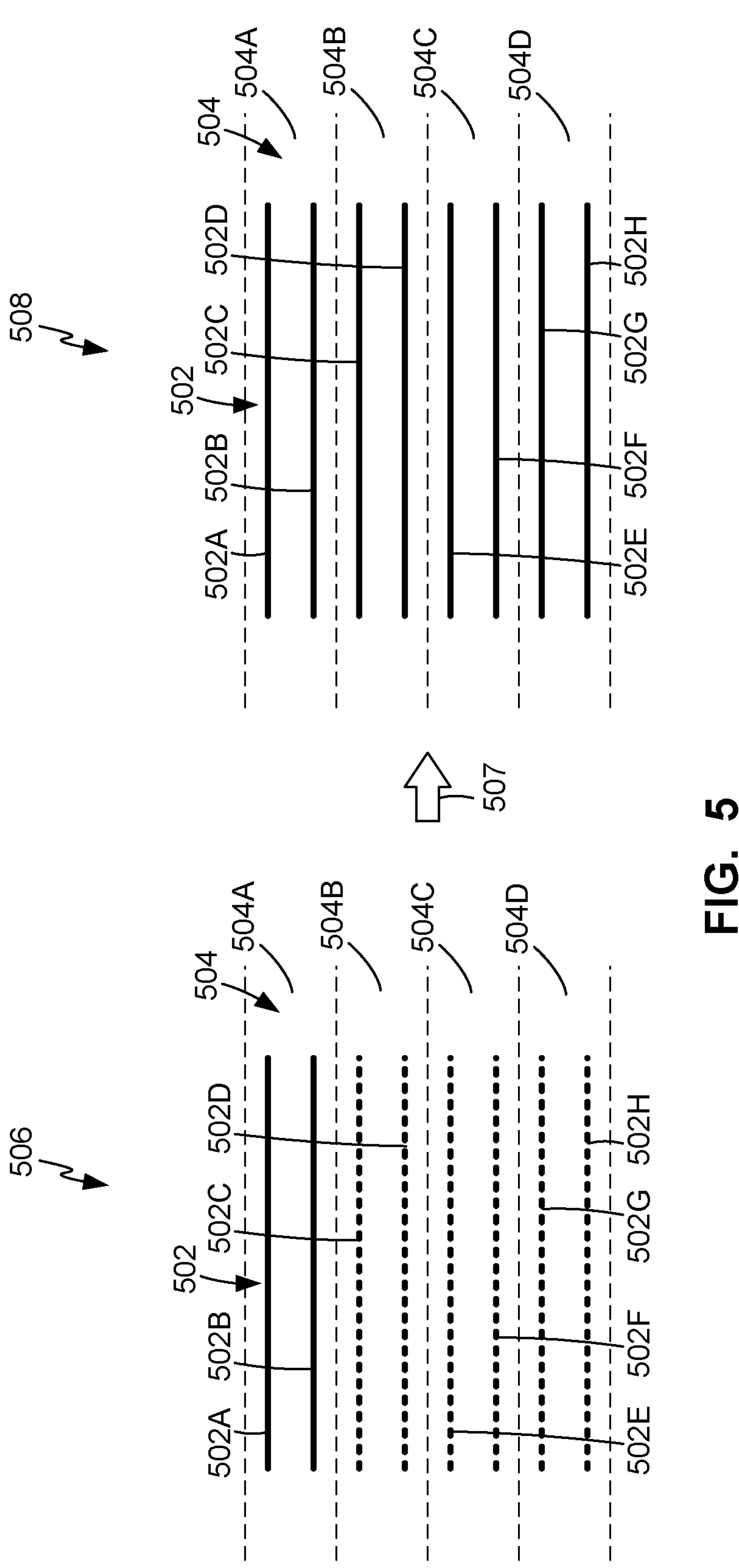
FIG. 5 illustrates changing a portion of the virtual links of a system from an inactive state to an active state, in accordance with exemplary embodiments.

In FIG. 5, an exemplary PCIe link consists of eight lanes 502 configured as four VLs 504. More specifically: a first VL 504A corresponds to the first and second lanes 502A and 502B; a second VL 504B corresponds to the third and fourth lanes 502C and 502D; a third VL 504C corresponds to the fifth and sixth lanes 502E and 502F; and a fourth VL 504D corresponds to the seventh and eighth lanes 502G and 502H. In an example of a first state of operation 506, the first and second lanes 502A and 502B are active, while the remaining lanes 502C-502H are inactive, i.e., in an electrically idle state. Lanes 502 that are in the active state are capable of transmitting data, while lanes 502 that are in the inactive state are not capable of transmitting data.

Subsequently, as indicated by the arrow 507, in an example of a second state of operation 508 the remaining lanes 502C-502H may be transitioned to an active state. For example, in the first state of operation 506, there may be only one VF (not shown) producing data packets to be transmitted. Accordingly, the single active VL 504A may provide sufficient bandwidth to transmit the data packets produced by that one VF. Then, for example, two additional VFs may begin producing data packets to be transmitted. The single active VL 504A may not provide sufficient bandwidth to transmit the data packets produced by the three VFs. By transitioning the inactive lanes 502C-502H to an active state, all four VLs 504A-504D become available for transmitting the data packets produced by the three VFs. In the second state of operation 508, the four VLs 504A-504D may together provide sufficient bandwidth to transmit the data packets produced by the three VFs. Conversely, if some of the VFs were to cease to transmit data packets, lanes 502 corresponding to one or more of the VLs 504 could be transitioned to the inactive state to conserve power. In other words, lane power states may be changed dynamically on a per-VL basis in response to changes in bandwidth demand. The systems described herein may configure VLs based on whatever lanes are active.

Figure 6A:
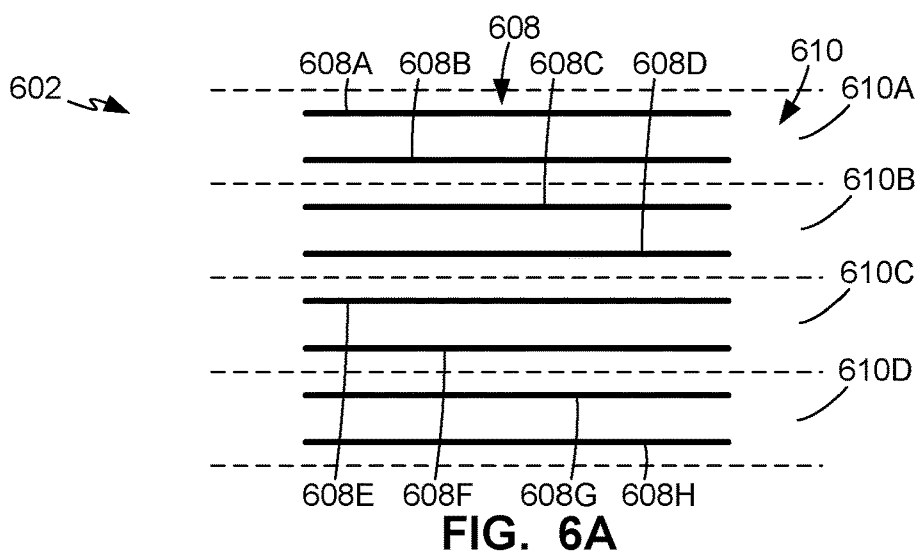
FIG. 6A illustrates an example of a virtual link configuration, in accordance with exemplary embodiments.
Figure 6B:
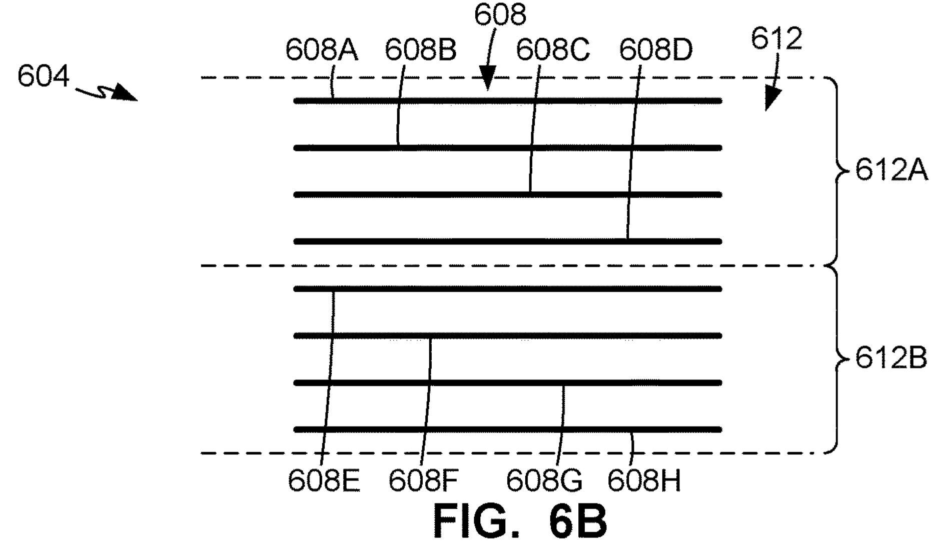
FIG. 6B illustrates another example of a virtual link configuration, in accordance with exemplary embodiments.
Figure 6C:
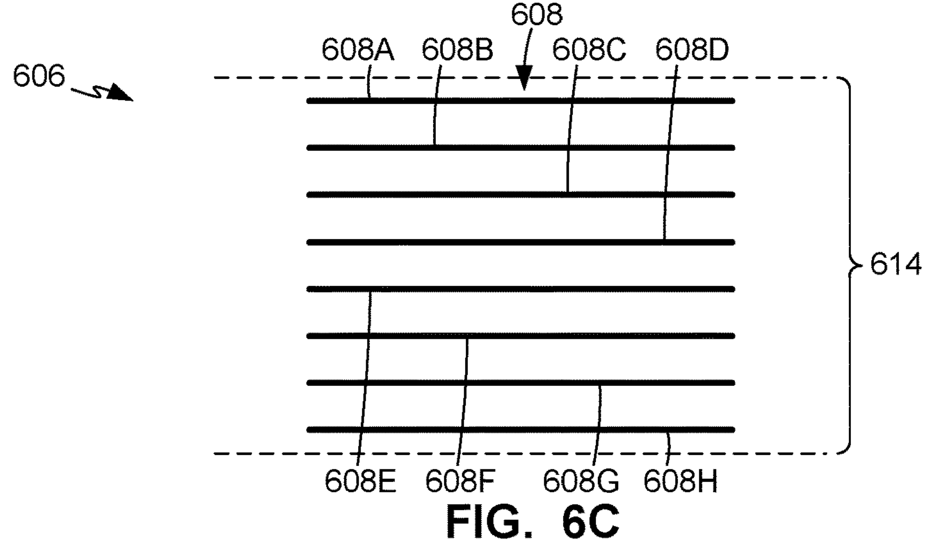
FIG. 6C illustrates still another example of a virtual link configuration, in accordance with exemplary embodiments.

In FIG. 6A, FIG. 6B, and FIG. 6C, three exemplary VL states or VL configurations 602, 604, and 606, respectively, are shown. The VL configurations 602, 604 and 606 may represent alternative configurations or reconfigurations of the same set of eight active lanes 608: 608A, 608B, 608C, 608D, 608E, 608F, 608G, and 608H.

In the VL configuration 602, the eight lanes 608 are configured as four VLs 610. More specifically: a first VL 610A corresponds to the first and second lanes 608A and 608B; a second VL 610B corresponds to the third and fourth lanes 608C and 608D; a third VL 610C corresponds to the fifth and sixth lanes 608E and 608F; and a fourth VL 610D corresponds to the seventh and eighth lanes 608G and 608H.

In the VL configuration 604, the eight lanes 608 are configured as two VLs 612. More specifically, a first VL 612A corresponds to the first through fourth lanes 608A-608D, and a second VL 612B corresponds to the fifth through eighth lanes 608E-608H. Lastly, in the VL configuration 606 the eight lanes 608 are configured as only one VL 614.

Generally, the number of VLs in a VL configuration may be a power of two. That is, there may be one (i.e., $2^0$) VL, two (i.e., $2^1$) VLs, four (i.e., $2^2$) VLs, etc., through some number $2^k$ VLs, where k is an integer. It may thus be appreciated that the number of possible VL cases or unique configurations is: log 2m+1, or $\log_2(2m)$, where m is the number of VLs. The VL case or configuration may be represented by an index integer i, where i may vary from 0 to k. For each such case or configuration i, the number of VLs may be m/2, and the virtual linkwidth of each VL in that case or configuration may be $2^i*(n/m)$, where n is the number of lanes or actual (non-virtual) linkwidth. For example, the VL case or configuration 602 shown in FIG. 6A, where there are four VLs 610 having virtual linkwidths of two, may be represented by i=0 or referred to as Case_0. The VL case or configuration 604 shown in FIG. 6B, where there are two VLs 612 having virtual linkwidths of four, may be represented by i=1 or referred to as Case_1. The VL case or configuration 606 shown in FIG. 6C, where there is only one VL 614 having a virtual linkwidth of eight, may be represented by i=2 or referred to as Case_2.

It may be appreciated that the VL case or configuration may be changed dynamically (e.g., by a host processor) in response to changes in link throughput demand. Alternatively, or in addition, a VL configuration may be selected based on differences in throughput requirements among the VFs. A host processor may select a VL case or configuration by, for example, storing the above-described case number (i) in a case register (not shown) in the root complex, and the root complex may include circuitry/logic (not shown) for reading the case register and configuring (or reconfiguring) the VLs accordingly.

In the exemplary VL cases or configurations described above, all VLs have the same virtual linkwidths as each other, i.e., consist of the same number of lanes (m) as each other. Nevertheless, another VL configuration may have VLs of two or more different virtual linkwidths. A VL having a higher virtual linkwidth may provide higher data throughput, while a VL having a lower virtual linkwidth may provide a lower data throughput. It should be understood that the terms "higher" and "lower" are used herein as meaning relative to each other; a VL may have a "higher" virtual linkwidth than another VL having a "lower" virtual linkwidth, and vice versa.

Figure 7:
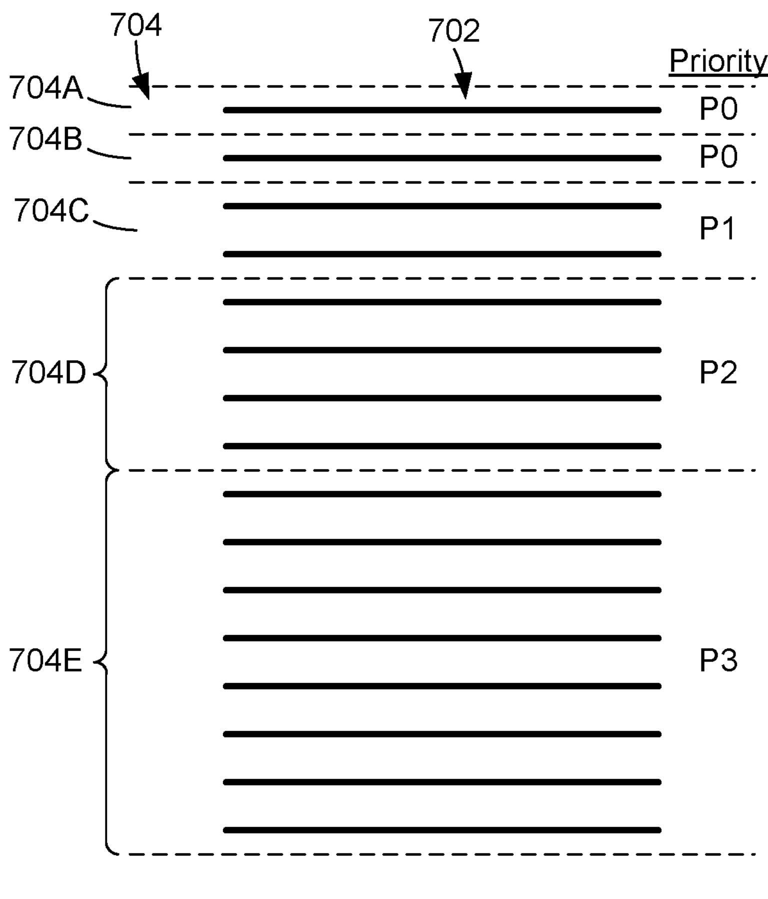
FIG. 7 illustrates an example of a priority virtual link configuration, in accordance with exemplary embodiments.

In FIG. 7, an exemplary VL configuration 700 is shown in which 16 lanes 702 are configured as five VLs 704: a first VL 704A having a virtual linkwidth of one; a second VL 704B also having a virtual linkwidth of one; a third VL 704C having a virtual linkwidth of two; a fourth VL 704D having a virtual linkwidth of four; and a fifth VL 704E having a virtual linkwidth of eight. A VL 704 having a higher virtual linkwidth may be used, for example, to transmit data produced by a VF (not shown in FIG. 7) that produces larger data packets, while a VL 704 having a lower virtual linkwidth may be used, for example, to transmit data produced by a VF (not shown in FIG. 7) that produces smaller data packets. The VFs are, as described above, associated with VMs (not shown in FIG. 7). Different VMs may have different priorities. That is, one VM's data transmissions may be prioritized relative to another VM's data transmissions.

The VL configuration 700 may be referred to as a priority VL configuration and may be used when different VMs have different priority levels. As shown in FIG. 7, the priorities may be referred to as P0 (or priority level 0), P1 (or priority level 1), P2 (or priority level 2), P3 (or priority level 3), etc. In the example shown in FIG. 7: the VL 704A has a priority level of 0; the VL 704B has a priority level of 0; the VL 704C has a priority level of 1; the VL 704D has a priority level of 2; and the VL 704E has a priority level of 3. It may be noted that the priority levels for the different VLs 704 are: 0, 0, 1, 2, 3 . . . k, where $k=\log_2(n/2)$, and n is the actual linkwidth or total number of lanes 702 of the PCIe link.

Figure 8:
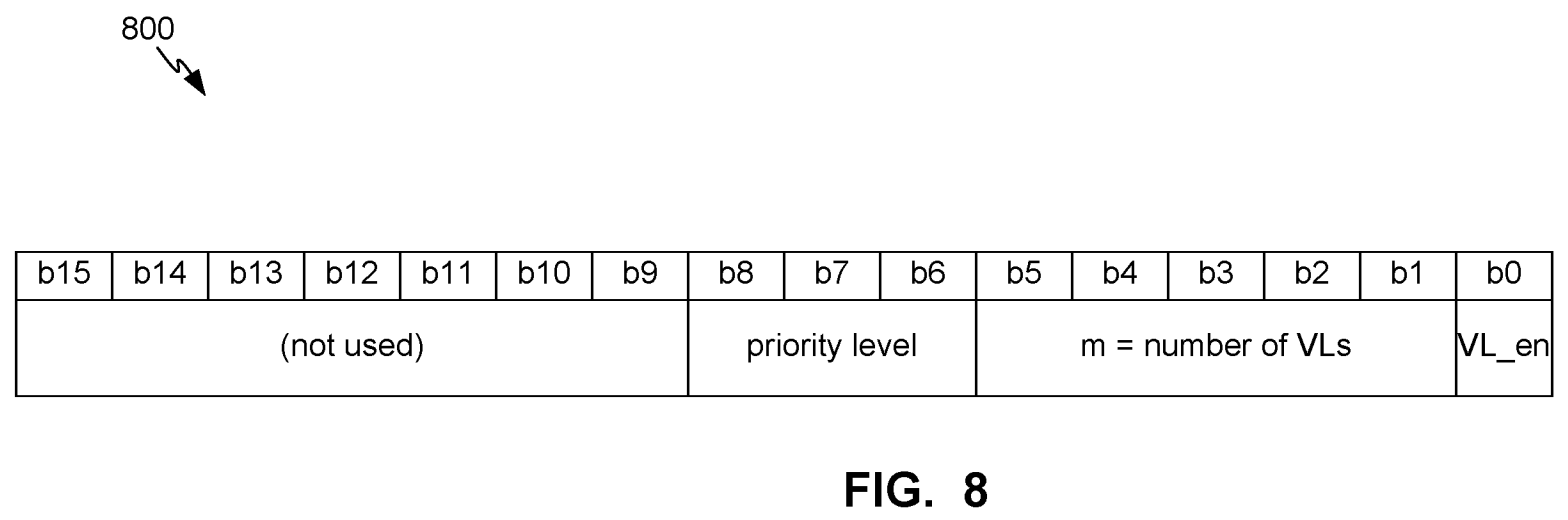

As shown in FIG. 8, a control register 800 may be provided in, for example, the root complex (not shown). The control register 800 may comprise, for example, 16 bits, organized as several fields.

One field or bit of the control register 800, such as, for example, the least-significant bit ("b0"), may contain a VL_en value that indicates whether the virtual link feature is enabled. A host processor may set the value of VL_en to "1" to enable the virtual link feature or to "0" to disable the virtual link feature. Circuitry/logic in the root complex may read the VL_en value. When VL_en=1, such root complex circuitry/logic may configure the PCIe link into virtual lanes as described herein. When VL_en=0, the root complex may use the PCIe link without virtual links, such as in the manner described above with regard to FIG. 2.

Another field or group of bits of the control register 800, such as, for example, bits "b1"-"b5", may contain the above-described value m, representing the number of VLs into which the PCIe link is to be configured when VL_en=1. Yet another field or group of bits of the control register 800, such as, for example, bits "b6"-"b8", may contain the above-described priority level. The remaining bits "b9"-"b15" may be left unused or reserved. In an example, the root complex may configure the PCIe link with the above-described VL configuration 700 (FIG. 7) when the VL_en field contains a value of 1, the number (m) of VLs field contains a value of 5, and the priority level field contains a value of 3. In another example, the root complex may configure the PCIe link with the above-described VL configuration 602 (FIG. 6A) when the VL_en field contains a value of 1, the number (m) of VLs field contains a value of 4, and the priority level field contains a value of 0 (meaning that all VLs have equal priorities). In yet another example, the root complex may configure the PCIe link with the above-described VL configuration 604 (FIG. 6B) when the VL_en field contains a value of 1, the number (m) of VLs field contains a value of 2, and the priority level field contains a value of 0. In still another example, the root complex may configure the PCIe link with the above-described VL configuration 606 (FIG. 6C) when the VL_en field contains a value of 1, the number (m) of VLs field contains a value of 1, and the priority level field contains a value of 0.

Figure 9:
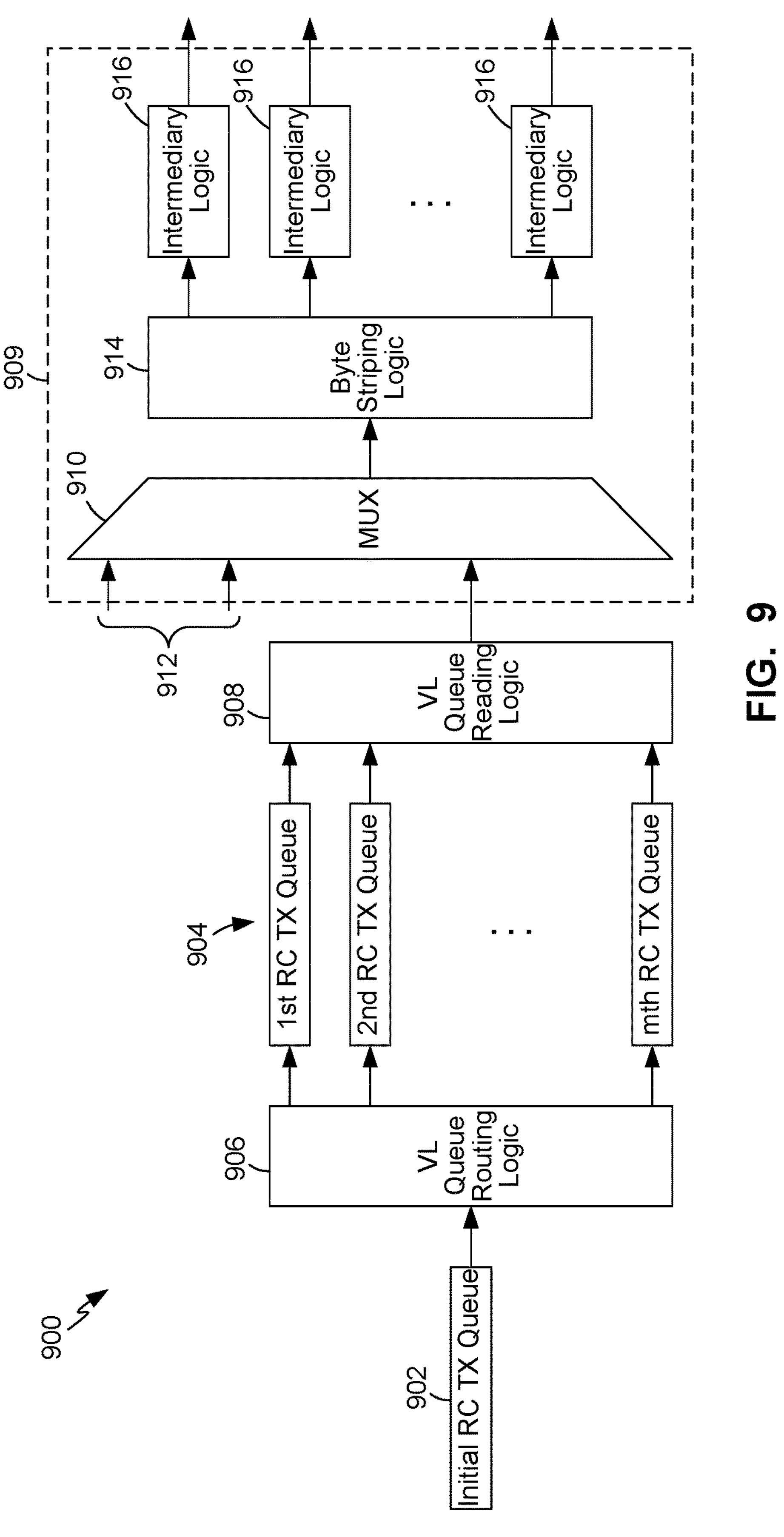
FIG. 9 illustrates a transmit portion of physical-layer root complex circuitry/logic, in accordance with exemplary embodiments.

In FIG. 9, a system 900 may be included in the TX side of a physical-layer portion of a root complex (not shown in FIG. 9). The system 900 may include an RC initial TX queue 902, which may be similar to the RC initial TX queue 314 described above with regard to FIGS. 3-4. The system 900 may also include RC VL TX queues 904, which may be similar to the RC VL TX queues 302 described above with regard to FIGS. 3-4.

The system 900 may further include VL queue routing circuitry/logic 906. The VL queue routing circuitry/logic 906 may be configured to provide data packets from the RC initial TX queue 902 to the RC VL TX queues 904 in the manner described above with regard to FIGS. 4-7. That is, the VL queue routing circuitry/logic 906 may distribute data produced by VFs (not shown in FIG. 9) among the RC VL TX queues 904. For example, in constructing data packets (commonly referred to in the PCIe realm as Transaction Layer Packets or "TLP"s), the VFs may include a virtual link identifier in a virtual link identifier field of each TLP packet header (not shown) when the virtual link feature is enabled (e.g., when the host processor has set VL_en=1). When the VL queue routing circuitry/logic 906 reads data packets (i.e., TLPs) in the RC initial TX queue 902, the VL queue routing circuitry/logic 906 may route or provide the data packets to the one of the RC VL TX queues 904 that is identified by the virtual link identifier in the TLP header of each data packet.

The system 900 may further include VL queue reading circuitry/logic 908. The VL queue reading circuitry/logic 908 may be configured to read a number of bytes of data from each RC VL TX queue 904. An example of this feature in operation is described below, but it may be appreciated here that this number of bytes taken from each RC VL TX queue 904 is equal to the VL linkwidth of the VL corresponding to that RC VL TX queue 904.

The remaining portion 909 of the system 900 may be in accordance with PCIe features. These features may include a multiplexer ("MUX") 910 that is controlled in a manner that combines the data obtained from the queues with various additional information 912. This additional information 912 may include framing symbols, ordered sets, and logical idle information, which may be specified by PCIe protocols. That is, the MUX 910 selects bytes of the data and bytes of the additional information 912 in a sequence. The MUX 910 as well as some other features of this portion 909 of the system 900 may be controlled by a Link Training and Status State Machine or "LTSSM" (not shown). Byte striping circuitry/logic 914 may stripe the bytes that are provided by the MUX 910 across all active lanes of the PCIe link. That is, the byte striping circuitry/logic 914 places each successive byte on a successive one of the lanes for transmission. The outputs of the byte striping circuitry/logic 914 may not be coupled directly to the physical lanes (e.g., wires) of the PCIe link but rather may be coupled indirectly through intermediary circuitry/logic 916. Such intermediary circuitry/logic 916 may include a scrambler, an encoder, a serializer, a differential signal driver, or other circuitry/logic, which are not directly relevant to the solutions described herein. The portion 909 may also be referred to as data transmitting circuitry/logic.

It should be understood that the system 900 may be included in a host processing system's root complex (not shown in FIG. 9). The system 900 may be included in the physical-layer portion of the root complex, other layers of which are not shown for purposes of clarity. Such other layers may provide features such as negotiating the number of active lanes with an endpoint, including changing the power states of lanes between active and inactive, etc.

Figure 10:
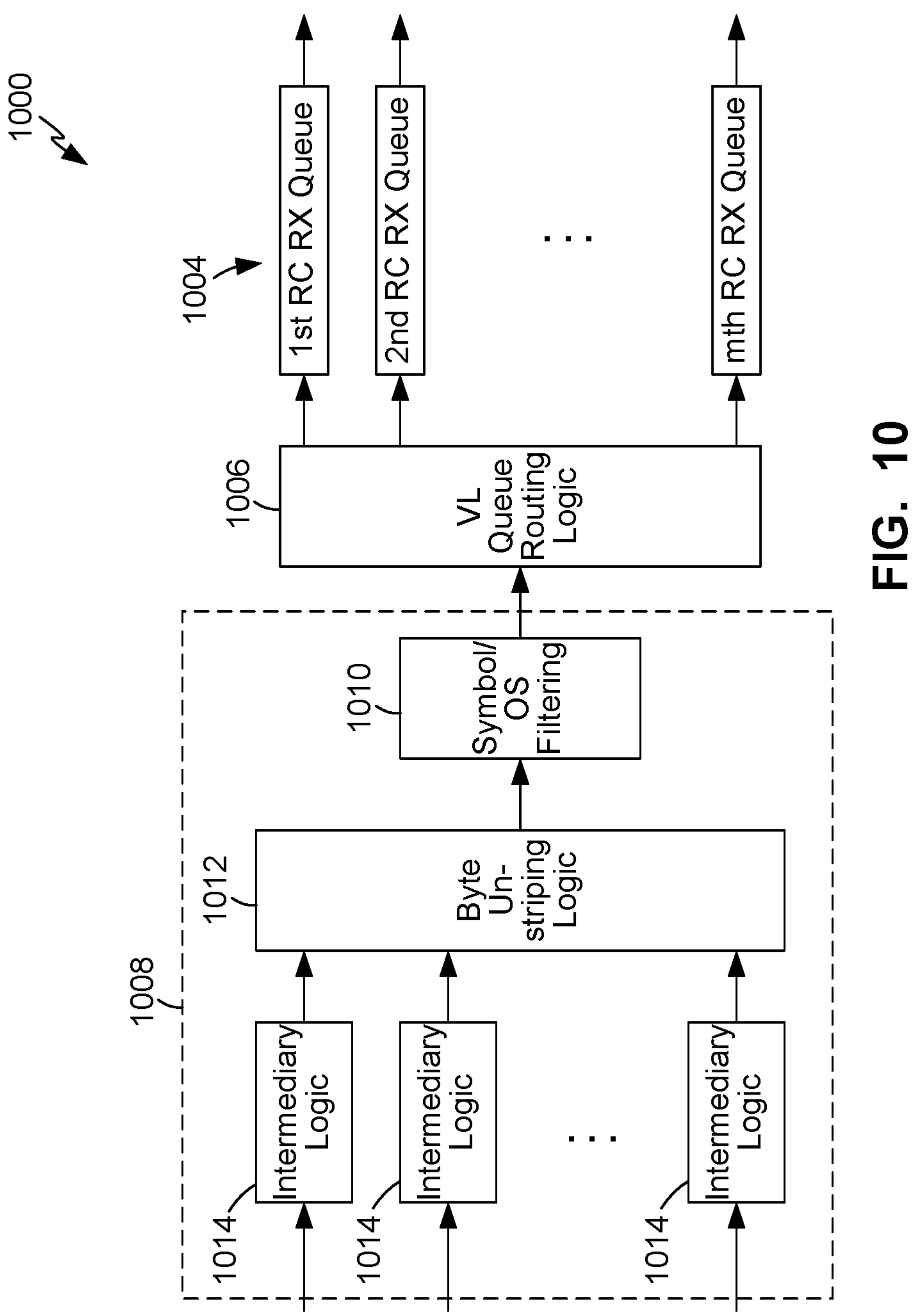
FIG. 10 illustrates a receive portion of physical-layer root complex circuitry/logic, in accordance with exemplary embodiments.

In FIG. 10, a system 1000 may be included in the RX side of a physical-layer portion of the root complex (not shown in FIG. 10). Although for purposes of clarity the system 1000 and the system 900 (FIG. 9) are shown separately in FIG. 10 and FIG. 9, respectively, they may be integrated together as the RX and TX portions of the physical-layer circuitry/logic of the root complex of a host system. It should be understood that similar systems, i.e., RX and TX portions of physical-layer circuitry/logic, may be included in an endpoint.

The system 1000 may include RC VL RX queues 1004, which may be similar to the RC VL RX queues 304 described above with regard to FIG. 3. The system 1000 may also include VL queue routing circuitry/logic 1006 configured to route or provide data that has been received over the PCIe link to the RC VL RX queues 1004 based on the virtual link identifiers in the TLP headers. The VL queue routing circuitry/logic 1006 may be configured to provide to an RC VL RX queue 1004 a number of bytes of received data equal to the VL linkwidth of the VL corresponding to that RC VL RX queue 1004. As noted above, an example of this feature in operation is described below.

The remaining portion 1008 of the system 1000 may be in accordance with PCIe features. These features may include symbol filtering and ordered set ("OS") filtering circuitry/logic 1010 that provides symbol and ordered set information to the above-referenced LTSSM (not shown). However, the filtering circuitry/logic 1010 may also provide the above-referenced received data to the VL queue routing circuitry/logic 1006. Features of the portion 1008 may also include byte unstriping circuitry/logic 1012 that may read data bytes across all active lanes of the PCIe link. That is, the byte unstriping circuitry/logic 1012 may read successive lanes to obtain successive bytes of the received data. The byte unstriping circuitry/logic 1012 may provide the received bytes to the filtering circuitry/logic 1010. The inputs of the byte unstriping circuitry/logic 1012 may not be coupled directly to the physical lanes of the PCIe link but rather may be coupled indirectly through intermediary circuitry/logic 1014. Such intermediary circuitry/logic 1014 may include a differential signal receiver, clock and data recovery circuitry/logic, a decoder, a descrambler, or other circuitry/logic which are not directly relevant to the solutions described herein. The portion 1008 may also be referred to as data receiving circuitry/logic.

Figure 11:
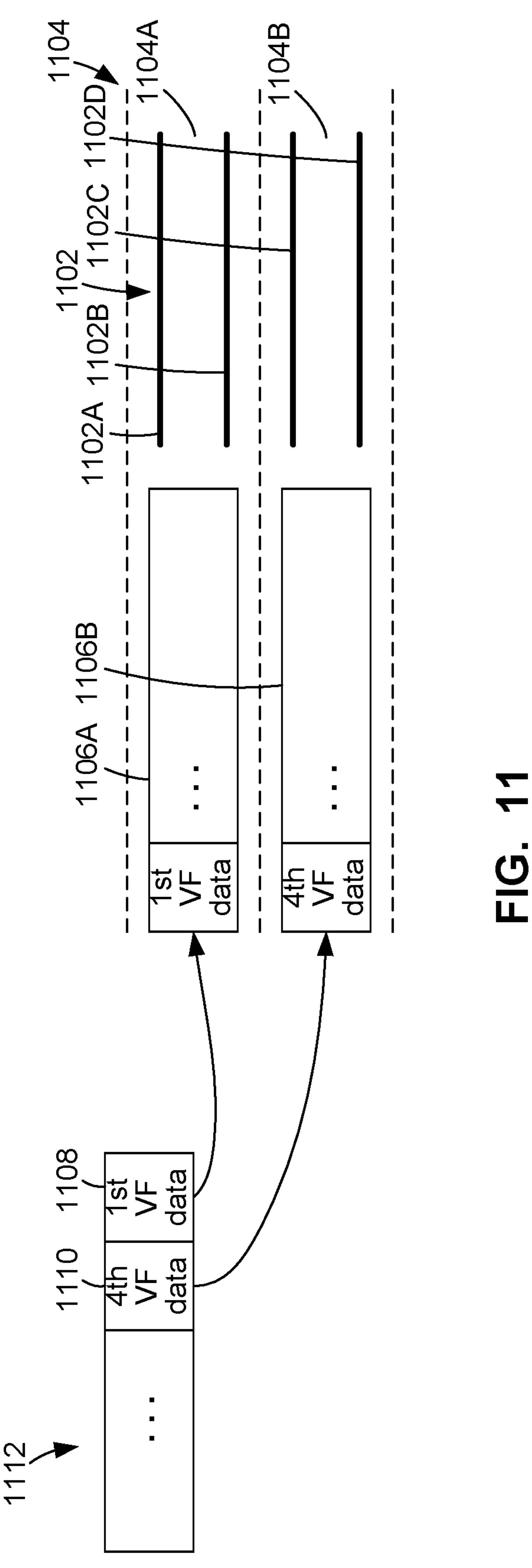
FIG. 11 illustrates an example of providing data to transmit queues, in accordance with exemplary embodiments.
Figure 12:
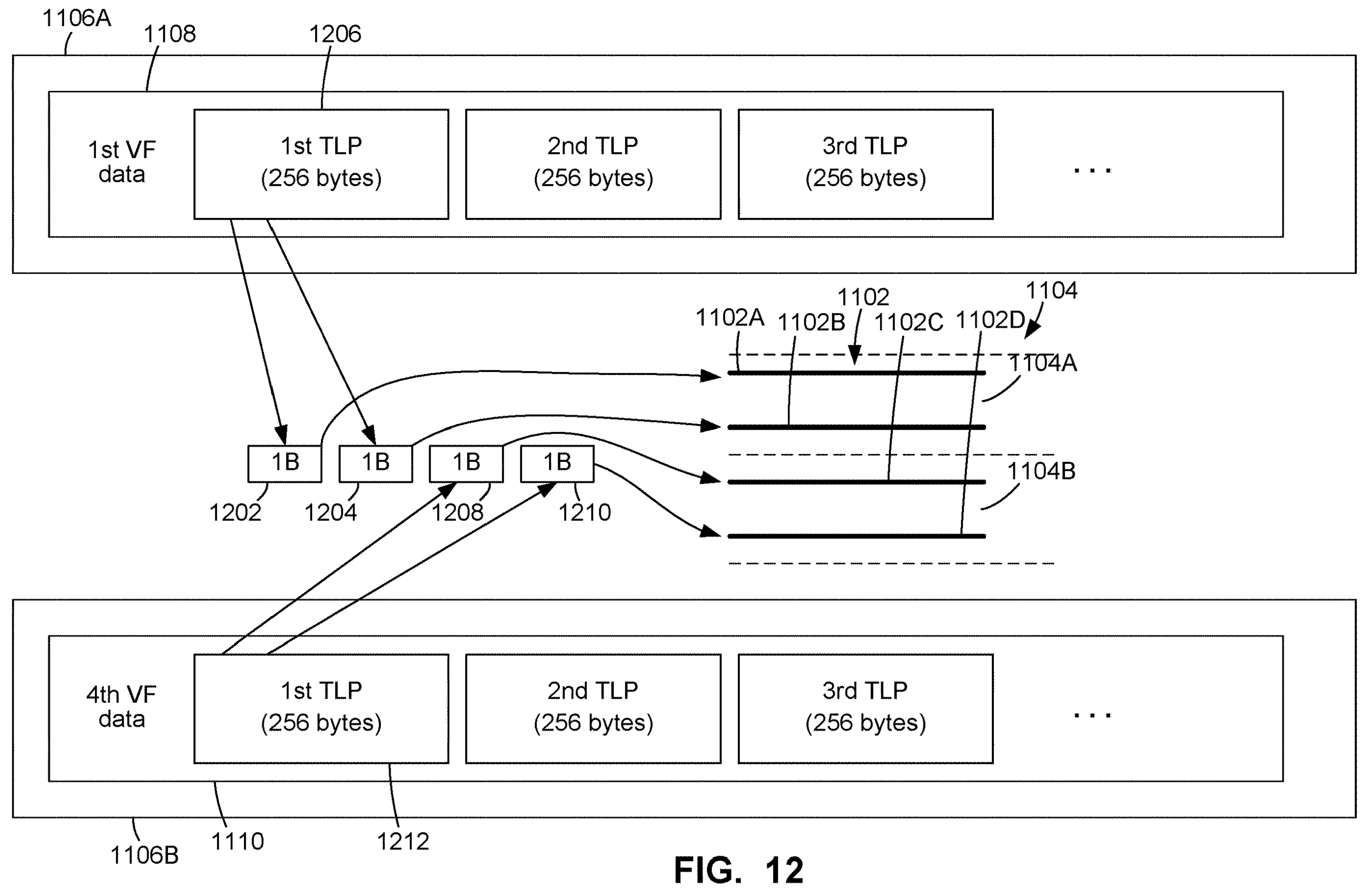
FIG. 12 illustrates providing data to virtual links from the transmit queues in the example of FIG. 11.

In FIGS. 11-12, an example of operation of the virtual link feature is shown in which four lanes 1102A, 1102B, 1102C, and 1102D (collectively, lanes 1102) are configured as two VLs 1104A and 1104B (collectively, VLs 1104). The VL 1104A corresponds to the lanes 1102A and 1102B, and the VL 1104B corresponds to the lanes 1102C and 1102D. The VL 1104A and the VL 1104B in this exemplary configuration correspond to an RC VL TX queue 1106A and an RC VL TX queue 1106B, respectively. There may be any number of VFs (not shown) serving as data packet sources, such as, for example, a first VF, a second VF, a third VF, a fourth VF, etc. In the illustrated example, a first group of data packets 1108 ("1st VF data") have been provided by a first VF to the initial TX queue 1112, and a second group of data packets 1110 ("4th VF data") have been provided by a fourth VF to the RC initial TX queue 1112. As described above with regard to FIG. 9, the VL queue routing logic 906 may provide or route the data bytes in this manner.

As shown in FIG. 12, a first byte of data 1202 and a second byte of data 1204 are provided from a first data packet (i.e., a Transaction Layer Packet or "TLP") 1206 of the first group of data packets 1108 ("1st VF data"), while a third byte of data 1208 and a fourth byte of data 1210 are provided from a first data packet 1212 of the second group of data packets 1110 ("4th VF data"). That is, two bytes of data 1202 and 1204 are provided from the RC VL TX queue 1106A, and two more bytes of data 1208 and 1210 are provided from the RC VL TX queue 1106B. More generally, the number of bytes of data provided from any one of the RC VL TX queues is equal to the virtual linkwidth of the VL corresponding to that RC VL TX queue. Because in this example the VL 1104A has a virtual linkwidth of two (lanes), two bytes of data 1202 and 1204 are provided to the VL 1104A from the RC VL TX queue 1106A. Likewise, because in this example the VL 1104B has a virtual linkwidth of two (lanes), two bytes of data 1208 and 1210 are provided to the VL 1104B from the RC VL TX queue 1106B. As described above with regard to FIG. 9, the VL queue reading logic 908 may provide the data bytes in this manner.

The four bytes of data 1202, 1204, 1208, and 1210 may be striped across the lanes 1102A, 1102B, 1102C, and 1102D, respectively. For example, the bytes of data 1202, 1204, 1208, and 1210 may be placed on the lanes 1102A, 1102B, 1102C, and 1102D, respectively. As described above with regard to FIG. 9, the byte striping logic 914 may stripe the data bytes in this manner.

Figure 13:
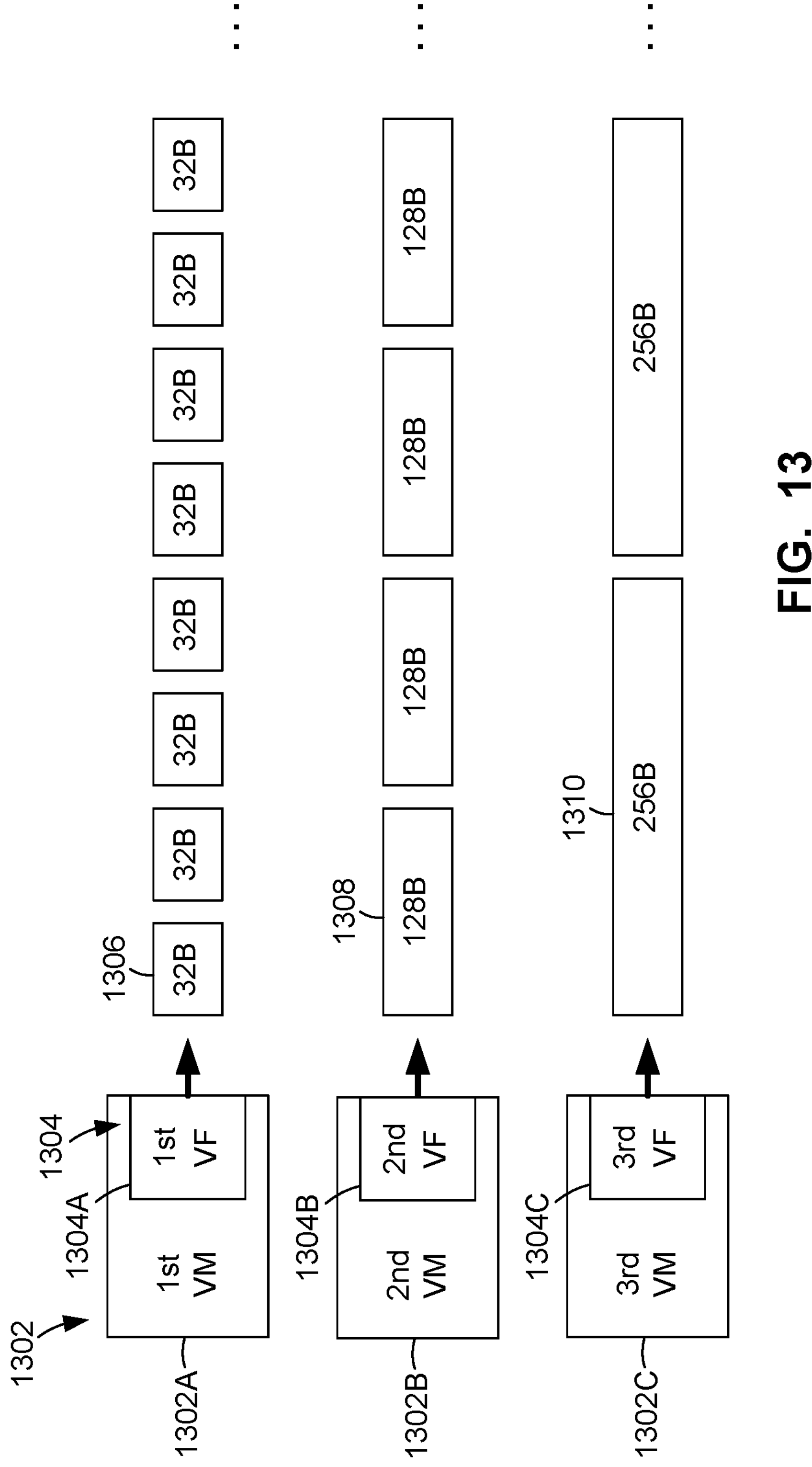
FIG. 13 illustrates an example of a use case in which virtual machines produce data packets of substantially differing sizes, in accordance with exemplary embodiments.

In FIG. 13, an example of operation is shown in which the above-described priority feature may be used. In the illustrated example, a first VM 1302A, a second VM 1302B, and a third VM 1302C (collectively VMs 1302) are providing data to be transmitted over a PCIe link (not shown). A first VF 1304A, a second VF 1304B, and a third VF 1304C (collectively, VFs 1304) may packetize data provided by their associated VMs 1302A, 1302B, and 1302C, respectively. Each of the multiple data packets 1306 provided by the first VF 1304A may have a size of, for example, 32 bytes. Each of the multiple data packets 1308 provided by the second VF 1304B may have a size of, for example, 128 bytes. Each of the multiple data packets 1310 provided by the third VF 1304C may have a size of, for example, 256 bytes. If the aforementioned data packets 1306, 1308, and 1310 of substantially different sizes are transmitted to a shared endpoint device over VLs of equal linkwidths, responses to the smaller data packets may be delayed while the endpoint device is responding to the larger data packets.

Figure 14:
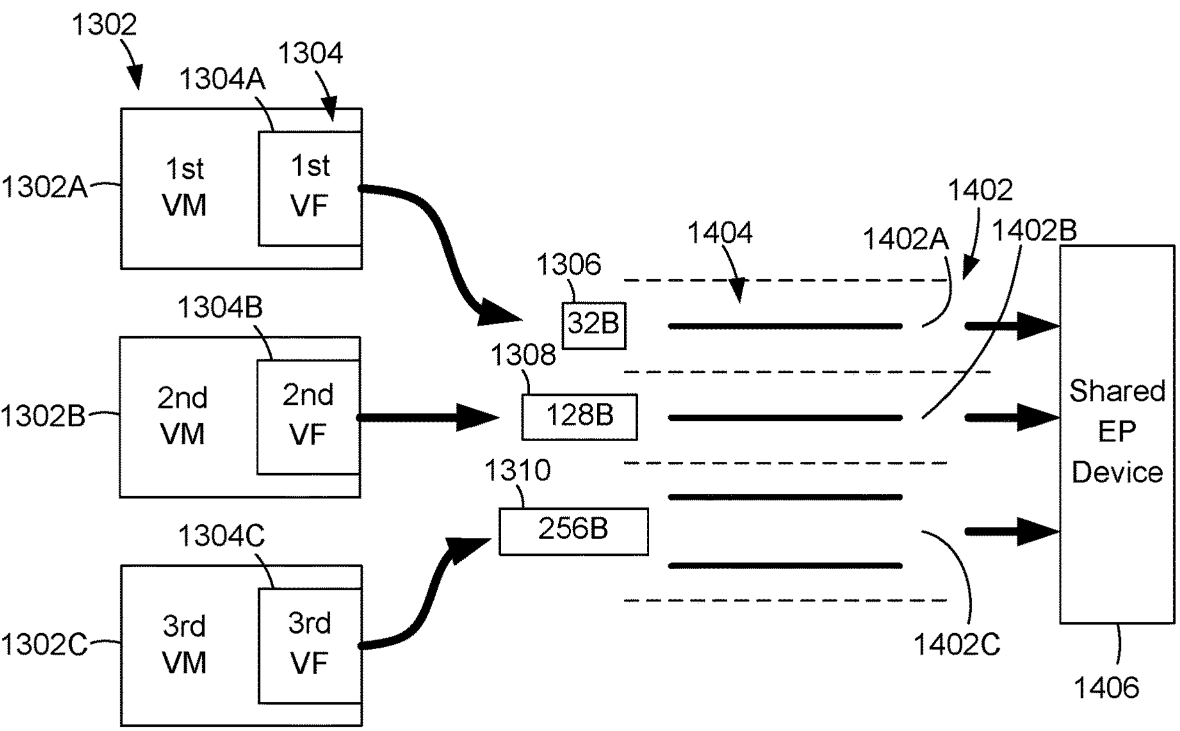
FIG. 14 illustrates providing the data packets in the example of FIG. 13 to virtual links having a priority configuration, in accordance with exemplary embodiments.

As shown in FIG. 14, the aforementioned data packets 1306, 1308, and 1310 may be transmitted in a more parallel manner to a shared endpoint 1406 by configuring the lanes 1404 in a priority VL configuration as described above with regard to FIG. 7 and associating prioritized VLs 1402 with the VMs 1302 based on packet size. For example, because the data provided by the third VM 1302C is formed into substantially larger packets 1310, the third VM 1302C may be given a higher priority than the other VMs 1302A and 1302B. The VL 1402C corresponding to the third VM 1302C and its associated VF 1304C may have a priority P1, and accordingly, may have a linkwidth of two, while the VLs 1402A and 1402B each may have a priority P0, and accordingly, may have a linkwidth of one.

Figure 15:
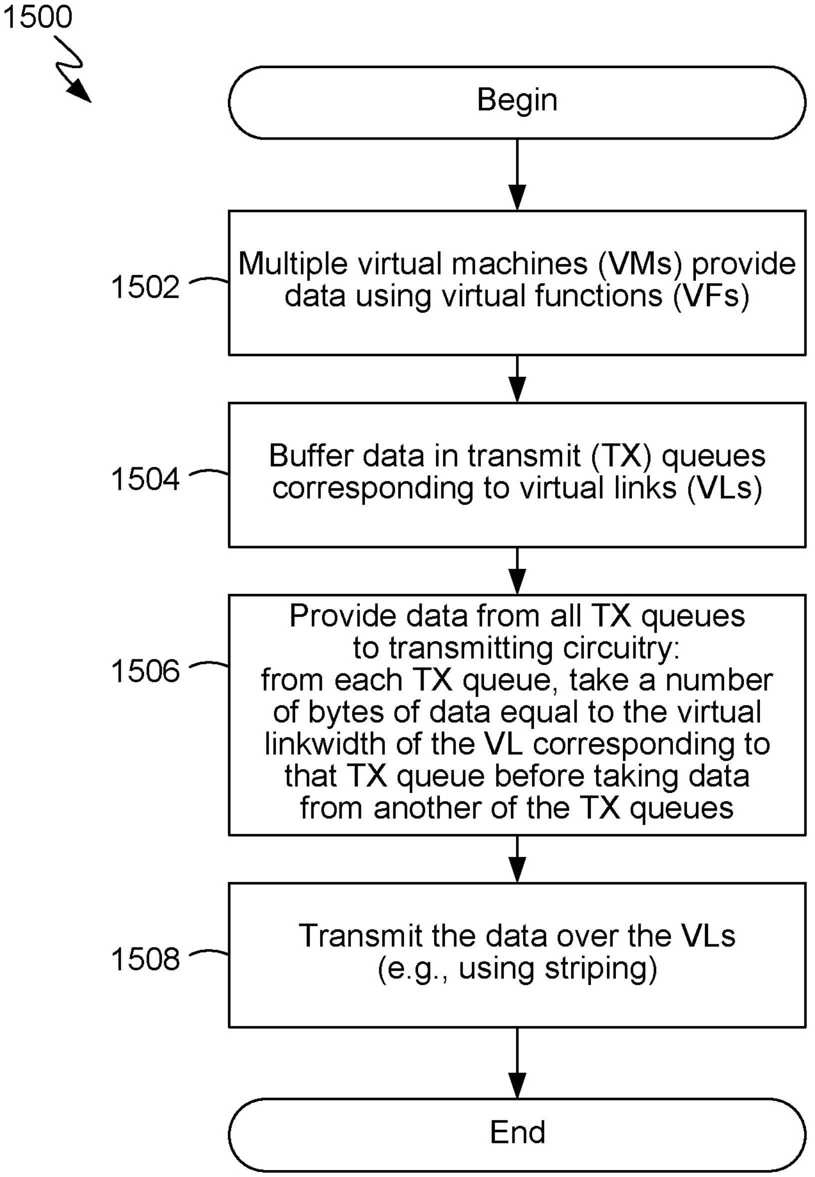
FIG. 15 is a flow diagram indicating a method for transmitting data over a link, in accordance with exemplary embodiments.

In FIG. 15, a method 1500 for transferring data over a link using VLs is shown in flow diagram format. As indicated by block 1502, multiple VMs may provide data using multiple VFs. As indicated by block 1504, the data may be buffered in VL TX queues corresponding to the VLs. As indicated by block 1506, the data may be provided from the VL TX queues to transmitting circuitry. This (block 1506) may include providing from one of the transmit queues a number of bytes of data equal to the virtual linkwidth of the VL corresponding to that transmit queue before providing data from another transmit queue. As indicated by block 1508, the data may be transmitted over the VLs. This (block 1508) may include striping data bytes across the lanes.

Figure 16:
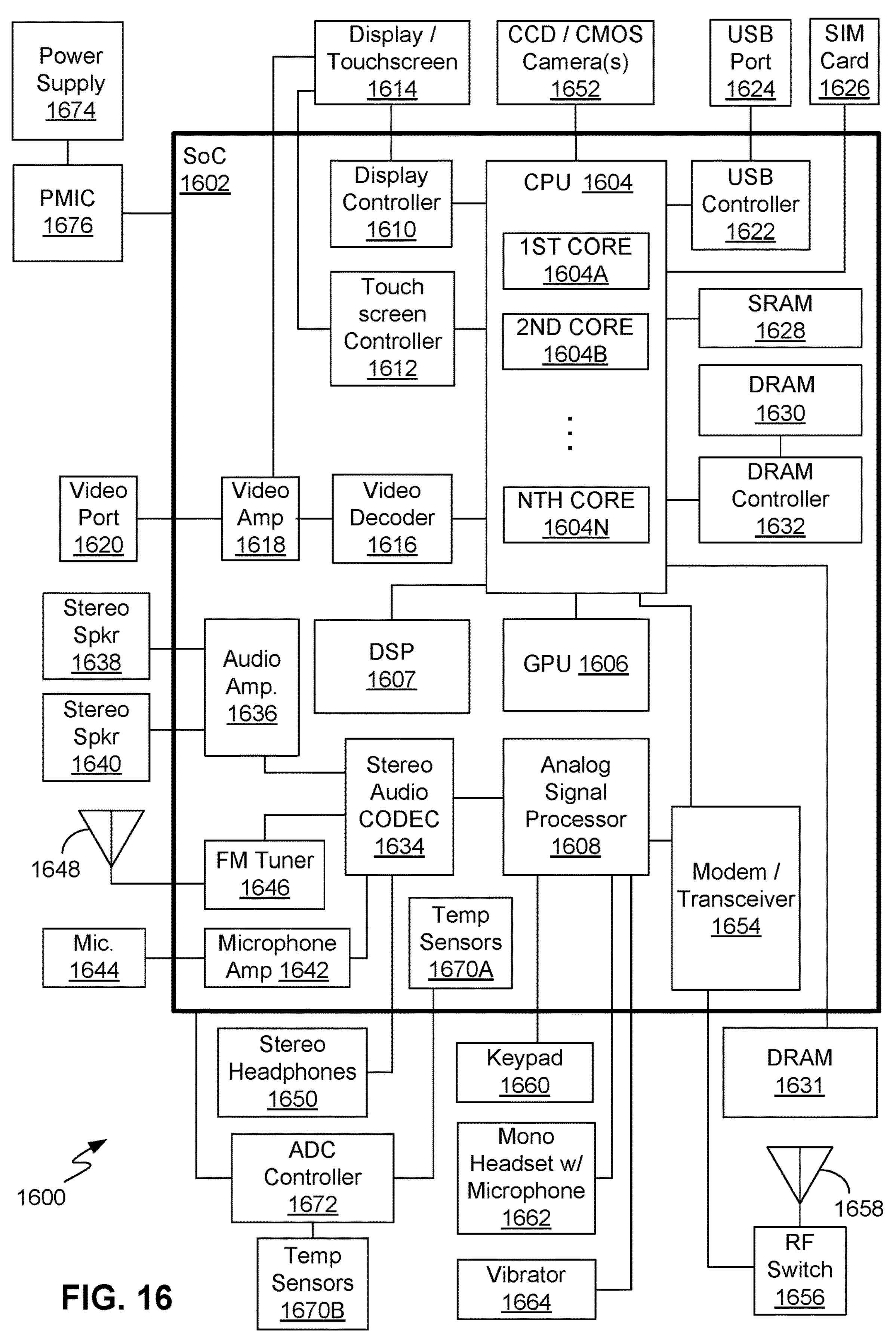
FIG. 16 is block diagram of a computing device in which a virtual link feature may be included, in accordance with exemplary embodiments.

FIG. 16 illustrates an example of a portable computing device ("PCD") 1600, in which exemplary embodiments of systems, methods, and other examples of transmitting data over a link may be provided. The PCD 1600 may be, for example, a laptop or palmtop computer, cellular telephone or smartphone, personal digital assistant, navigation device, smartbook, portable game console, satellite telephone, etc. For purposes of clarity, some data buses, interconnects, signals, etc., are not shown in FIG. 16.

The PCD 1600 may include an SoC 1602. The SoC 1602 may include a CPU 1604, a GPU 1606, a digital signal processor ("DSP") 1607, an analog signal processor 1608, a modem/modem subsystem 1654, or other processors. The CPU 1604 may include one or more CPU cores, such as a first CPU core 1604A, a second CPU core 1604B, etc., through an Nth CPU core 1604N.

A display controller 1610 and a touch-screen controller 1612 may be coupled to the CPU 1604. A touchscreen display 1614 external to the SoC 1602 may be coupled to the display controller 1610 and the touch-screen controller 1612. The PCD 1600 may further include a video decoder 1616 coupled to the CPU 1604. A video amplifier 1618 may be coupled to the video decoder 1616 and the touchscreen display 1614. A video port 1620 may be coupled to the video amplifier 1618. A universal serial bus ("USB") controller 1622 may also be coupled to CPU 1604, and a USB port 1624 may be coupled to the USB controller 1622. A subscriber identity module ("SIM") card 1626 may also be coupled to the CPU 1604.

The CPU 1604 may be coupled to one or more memories, with which the CPU 1604 may initiate memory transactions. The one or more memories may include both volatile and non-volatile memories or NVMs. Examples of volatile memories include static random access memory ("SRAM") 1628 and dynamic random access memory ("DRAM") 1630 and 1631. Such memories may be internal to the SoC 1602, as in the case of the DRAM 1630, or external to the SoC, as in the case of the DRAM 1631. A DRAM controller 1629 coupled to the CPU 1604 may control the writing of data to, and reading of data from, the DRAM 1630.

A stereo audio CODEC 1634 may be coupled to the analog signal processor 1608. Further, an audio amplifier 1636 may be coupled to the stereo audio CODEC 1634. First and second stereo speakers 1638 and 1640, respectively, may be coupled to the audio amplifier 1636. In addition, a microphone amplifier 1642 may be coupled to the stereo audio CODEC 1634, and a microphone 1644 may be coupled to the microphone amplifier 1642. A frequency modulation ("FM") radio tuner 1646 may be coupled to the stereo audio CODEC 1634. An FM antenna 1648 may be coupled to the FM radio tuner 1646. Further, stereo headphones 1650 may be coupled to the stereo audio CODEC 1634. Other devices that may be coupled to the CPU 1604 include one or more digital (e.g., CCD or CMOS) cameras 1652.

The RF transceiver or modem subsystem 1654 may be coupled to the analog signal processor 1608 and the CPU 1604. An RF switch 1656 may be coupled to the modem subsystem 1654 and an RF antenna 1658. In addition, a keypad 1660, a mono headset with a microphone 1662, and a vibrator device 1664 may be coupled to the analog signal processor 1608.

The SoC 1602 may have one or more internal or on-chip thermal sensors 1670A and may be coupled to one or more external or off-chip thermal sensors 1670B. An analog-to-digital converter controller 1672 may convert voltage drops produced by the thermal sensors 1670A and 1670B to digital signals. A power supply 1674 and a power management integrated circuit ("PMIC") 1676 may supply power to the SoC 1602.

One or more of the data communication interconnections between the CPU 1504 and a memory subsystem, modem subsystem, or other subsystems or peripheral devices may comprise a PCIe link. The PCIe link may be configured with SRIOV and the virtual link feature described above.

Firmware or software may be stored in any of the above-described memories, such as the DRAMs 1630 and 1631, the SRAM 1628, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for transferring data over a link having a plurality of active lanes, comprising:
   - buffering in a plurality of transmit queues data packets provided by each of a plurality of transmitting components, each transmit queue corresponding to one of a plurality of virtual links, each virtual link having a virtual linkwidth equal to a width of a portion of the plurality of active lanes uniquely corresponding to the virtual link; and
   - providing data from each of the transmit queues to data transmitting circuitry coupled to the plurality of active lanes.

2. The method of clause 1, wherein providing data from each of the transmit queues comprises providing from one of the transmit queues a number of bytes of data equal to the virtual linkwidth of the virtual link corresponding to the one of the transmit queues before providing data from another of the transmit queues.

3. The method of clause 1 or 2, wherein:
   - the link comprises a Peripheral Component Interconnect Express (PCIe) link configured for Single-Root Input/Output Virtualization (SRIOV);
   - the plurality of transmitting components comprises a plurality of virtual machines of a host processing system; and
   - the method further comprises providing the data packets from a virtual function associated with each virtual machine to the plurality of transmit queues.

4. The method of any of clauses 1-3, further comprising each of the transmitting components including a virtual link identifier in a transaction layer packet header, the virtual link identifier identifying one of the virtual links.

5. The method of any of clauses 1-4, further comprising:
   - receiving data over the plurality of active lanes by data receiving circuitry coupled to the plurality of active lanes; and
   - providing, by the data receiving circuitry, the data received over the plurality of active lanes to a plurality of receive queues, each receive queue corresponding to one of the transmit queues and corresponding to one of the virtual links, including buffering data packets in the receive queues correspondingly to the buffering of the data packets in the transmit queues, and including providing to one of the receive queues a number of bytes of data equal to the virtual linkwidth of the virtual link corresponding to the one of the receive queues before providing data to another of the receive queues.

6. The method of any of clauses 1-5, further comprising dynamically changing the virtual linkwidths of a plurality of the virtual links.

7. The method of any of clauses 1-6, wherein at least a first one of the virtual links has a higher virtual linkwidth, and a second one of the virtual links has a lower virtual linkwidth.

8. The method of clause 7, wherein:
   - each of the transmitting components has a priority associated therewith, a first one of the transmitting components has a higher priority, and a second one of the transmitting components has a lower priority; and
   - buffering the data packets comprises buffering data packets provided by the first one of the transmitting components in a transmit queue corresponding to the first one of the virtual links and buffering data packets provided by the second one of the transmitting components in a transmit queue corresponding to the second one of the virtual links.

9. The method of clause 8, wherein the first one of the transmitting components produces larger data packets, and the second one of the transmitting components produces smaller data packets.

10. The method of any of clauses 1-9, wherein the link consists of the plurality of active lanes and at least one electrically idle lane.

11. A system for transferring data over a link, comprising:
   - a plurality of transmit queues, each corresponding to one of a plurality of virtual links, each virtual link having a virtual linkwidth equal to a width of a portion of the plurality of active lanes uniquely corresponding to the virtual link;
   - transmit queue routing circuitry configured to buffer in the transmit queues data packets received from a plurality of transmitting components; and
   - transmit queue reading circuitry configured to provide data from each of the transmit queues to data transmitting circuitry coupled to a plurality of active lanes of the link.

12. The system of clause 11, wherein the transmit queue reading circuitry is configured to provide from one of the transmit queues a number of bytes of data equal to the virtual linkwidth of the virtual link corresponding to the one of the transmit queues before providing data from another of the transmit queues.

13. The system of clause 11 or 12, wherein:
   - the link having the plurality of active lanes comprises a Peripheral Component Interconnect express (PCIe) link configured for Single-Root Input/Output Virtualization (SRIOV);
   - the plurality of transmitting components comprises a plurality of virtual machines of a host processing system; and
   - the transmit queue routing circuitry is configured to transfer the data packets from a virtual function associated with each virtual machine to the plurality of transmit queues.

14. The system of any of clauses 11-13, wherein each of the transmitting components is configured to include a virtual link identifier in a transaction layer packet header, the virtual link identifier identifying one of the virtual links.

15. The system of any of clauses 11-14, further comprising:
   - a plurality of receive queues, each corresponding to one of the virtual links and corresponding to one of the transmit queues; and receive queue routing logic configured to buffer data received by data receiving circuitry over the plurality of active lanes in the plurality of receive queues, wherein the receive queue routing logic is configured to provide to one of the receive queues a number of bytes of data equal to the virtual linkwidth of the virtual link corresponding to the one of the receive queues before providing data to another of the receive queues.

16. The system of any of clauses 11-15, wherein at least a first one of the virtual links has a higher virtual linkwidth, and a second one of the virtual links has a lower virtual linkwidth.

17. The system of clause 16, wherein:

each of the transmitting components has a priority associated therewith, a first one of the transmitting components has a higher priority, and a second one of the transmitting components has a lower priority; and the receive queue routing logic is configured to buffer the data packets provided by the first one of the transmitting components in one of the transmit queues corresponding to the first one of the virtual links and to buffer data packets provided by the second one of the transmitting components in another of the transmit queues corresponding to the second one of the virtual links.

18. The system of clause 17, wherein the first one of the transmitting components is configured to produce larger data packets, and the second one of the transmitting components is configured to produce smaller data packets.

19. The system of any of clauses 11-18, wherein the link consists of the plurality of active lanes and at least one electrically idle lane.

20. A system for transferring data over a link having a plurality of active lanes, comprising:

means for buffering data packets provided by each one of a plurality of transmitting components in one of a plurality of transmit queues, each transmit queue corresponding to one of a plurality of virtual links, each virtual link having a virtual linkwidth equal to a width of a portion of the plurality of active lanes uniquely corresponding to the virtual link; and means for providing data from each of the transmit queues to data transmitting circuitry coupled to the plurality of active lanes.

21. The system of clause 20, wherein the means for providing data from each of the transmit queues comprises means for providing from one of the transmit queues a number of bytes of data equal to the virtual linkwidth of the virtual link corresponding to the one of the transmit queues before providing data from another of the transmit queues.

22. The system of clause 20 or 21, wherein:

the link having the plurality of active lanes comprises a Peripheral Component Interconnect express link configured for Single-Root Input/Output Virtualization (SRIOV);

the plurality of transmitting components comprises a plurality of virtual machines of a host processing system; and the system further comprises means for providing the data packets from a virtual function associated with each virtual machine to the plurality of transmit queues.

23. The system of any of clauses 20-22, further comprising means for including a virtual link identifier in a transaction layer packet header, the virtual link identifier identifying one of the virtual links.

24. The system of any of clauses 20-23, further comprising:

means for receiving data over the plurality of active lanes; and means for providing the data received over the plurality of active lanes to a plurality of receive queues, each receive queue corresponding to one of the transmit queues and corresponding to one of the virtual links, including means for buffering data packets in the receive queues correspondingly to the buffering of the data packets in the transmit queues, and including means for providing to one of the receive queues a number of bytes of data equal to the virtual linkwidth of the virtual link corresponding to the one of the receive queues before providing data to another of the receive queues.

25. A system for transferring data over a Peripheral Component Interconnect Express (PCIe) link, comprising:

a plurality of transmit queues in a PCIe root complex, each corresponding to one of a plurality of virtual links, each virtual link having a virtual linkwidth equal to a width of a portion of a plurality of active lanes of the PCIe link uniquely corresponding to the virtual link, wherein the PCIe link is configured in Single-Root Input/Output Virtualization (SRIOV);

transmit queue routing circuitry in the PCIe root complex configured to buffer in the transmit queues data packets received from a plurality of virtual machines; and transmit queue reading circuitry in the PCIe root complex configured to provide data from each of the transmit queues to data transmitting circuitry coupled to a plurality of active lanes of the PCIe link.

26. The system of clause 25, wherein the transmit queue reading circuitry is configured to provide from one of the transmit queues a number of bytes of data equal to the virtual linkwidth of the virtual link corresponding to the one of the transmit queues before providing data from another of the transmit queues.

27. The system of clause 25 or 26, wherein the transmit queue routing circuitry is configured to transfer the data packets from a virtual function associated with each virtual machine to the plurality of transmit queues.

28. The system of any of clauses 25-27, wherein each of the virtual functions is configured to include a virtual link identifier in a transaction-layer packet (TLP) header, the virtual link identifier identifying one of the virtual links.

29. The system of any of clauses 25-28, further comprising:

a plurality of receive queues in a PCIe endpoint, each corresponding to one of the virtual links and corresponding to one of the transmit queues; and receive queue routing logic configured to buffer data received by data receiving circuitry over the plurality of active lanes in the plurality of receive queues, wherein the receive queue routing logic is configured to provide to one of the receive queues a number of bytes of data equal to the virtual linkwidth of the virtual link corresponding to the one of the receive queues before providing data to another of the receive queues.

30. The system of any of clauses 25-29, wherein at least a first one of the virtual links has a higher virtual linkwidth, and a second one of the virtual links has a lower virtual linkwidth.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for transferring data over a link having a plurality of active lanes, comprising:

indicating virtual links will be used over the link having the plurality of active lanes with a control register;

identifying a count for a plurality of virtual links to be used over the link with a control register;

identifying a priority level for each virtual link with the control register;

buffering in a plurality of transmit queues data packets provided by each of a plurality of transmitting components, each transmit queue corresponding to one of the plurality of virtual links established in accordance with the control register, each virtual link having a virtual linkwidth equal to a width of active lanes uniquely corresponding to a respective virtual link; and providing data from each of the transmit queues to data transmitting circuitry coupled to the plurality of active lanes; wherein providing data from each of the transmit queues comprises providing from one of the transmit queues a number of bytes of data equal to a virtual linkwidth of a respective virtual link corresponding to one of the transmit queues before providing data from another of the transmit queues.

2. The method of claim 1, wherein:

the link having the plurality of active lanes comprises a Peripheral Component Interconnect Express (PCIe) link configured for Single-Root Input/Output Virtualization (SRIOV);

the plurality of transmitting components comprises a plurality of virtual machines of a host processing system; and the method further comprises providing the data packets from a virtual function associated with each virtual machine to the plurality of transmit queues.

3. The method of claim 1, further comprising each of the transmitting components including a virtual link identifier in a transaction layer packet header, the virtual link identifier identifying one of the virtual links.

4. The method of claim 1, further comprising:

receiving data over the plurality of active lanes by data receiving circuitry coupled to the plurality of active lanes; and providing, by the data receiving circuitry, the data received over the plurality of active lanes to a plurality of receive queues, each receive queue corresponding to one of the transmit queues and corresponding to one of the virtual links, including buffering data packets in the receive queues correspondingly to the buffering of the data packets in the transmit queues, and including providing to one of the receive queues a number of bytes of data equal to a virtual linkwidth of a respective virtual link corresponding to one of the receive queues before providing data to another of the receive queues.

5. The method of claim 1, further comprising dynamically changing the virtual linkwidths of a plurality of the virtual links.

6. The method of claim 1, wherein at least a first one of the virtual links has a higher virtual linkwidth, and a second one of the virtual links has a lower virtual linkwidth.

7. The method of claim 6, wherein:

each of the transmitting components is assigned to a virtual link, where each virtual link has a priority level identified by the control register, a first one of the transmitting components has a higher priority, and a second one of the transmitting components has a lower priority; and buffering the data packets comprises buffering data packets provided by the first one of the transmitting components in a transmit queue corresponding to the first one of the virtual links and buffering data packets provided by the second one of the transmitting components in a transmit queue corresponding to the second one of the virtual links.

8. The method of claim 7, wherein the first one of the transmitting components produces larger data packets, and the second one of the transmitting components produces smaller data packets.

9. The method of claim 1, wherein the link consists of the plurality of active lanes and at least one electrically idle lane.

10. A system for transferring data over a link, comprising:

a control register indicating virtual links will be used over the link having the plurality of active lanes, the control register identifying a count for a plurality of virtual links to be used over the link, and the control register identifying a priority level for each virtual link;

a plurality of transmit queues, each corresponding to one of the plurality of virtual links established in accordance with the control register, each virtual link having a virtual linkwidth equal to a width of active lanes uniquely corresponding to a respective virtual link;

transmit queue routing circuitry configured to buffer in the transmit queues data packets received from a plurality of transmitting components; and transmit queue reading circuitry configured to provide data from each of the transmit queues to data transmitting circuitry coupled to a plurality of active lanes of the link, the transmit queue reading circuitry is configured to provide from one of the transmit queues a number of bytes of data equal to a virtual linkwidth of a respective virtual link corresponding to one of the transmit queues before providing data from another of the transmit queues.

11. The system of claim 10, wherein:

the link having the plurality of active lanes comprises a Peripheral Component Interconnect express (PCIe) link configured for Single-Root Input/Output Virtualization (SRIOV);

the plurality of transmitting components comprises a plurality of virtual machines of a host processing system; and the transmit queue routing circuitry is configured to transfer the data packets from a virtual function associated with each virtual machine to the plurality of transmit queues.

12. The system of claim 10, wherein each of the transmitting components is configured to include a virtual link identifier in a transaction layer packet header, the virtual link identifier identifying one of the virtual links.

13. The system of claim 10, further comprising:

a plurality of receive queues, each corresponding to one of the virtual links and corresponding to one of the transmit queues; and receive queue routing logic configured to buffer data received by data receiving circuitry over the plurality of active lanes in the plurality of receive queues, wherein the receive queue routing logic is configured to provide to one of the receive queues a number of bytes of data equal to a virtual linkwidth of a respective virtual link corresponding to one of the receive queues before providing data to another of the receive queues.

14. The system of claim 10, wherein at least a first one of the virtual links has a higher virtual linkwidth, and a second one of the virtual links has a lower virtual linkwidth.

15. The system of claim 14, wherein:

each of the transmitting components is assigned to a virtual link, where each virtual link has a priority level identified by the control register, a first one of the transmitting components has a higher priority, and a second one of the transmitting components has a lower priority; and the receive queue routing logic is configured to buffer the data packets provided by the first one of the transmitting components in one of the transmit queues corresponding to the first one of the virtual links and to buffer data packets provided by the second one of the transmitting components in another of the transmit queues corresponding to the second one of the virtual links.

16. The system of claim 15, wherein the first one of the transmitting components is configured to produce larger data packets, and the second one of the transmitting components is configured to produce smaller data packets.

17. The system of claim 10, wherein the link consists of the plurality of active lanes and at least one electrically idle lane.

18. A system for transferring data over a Peripheral Component Interconnect Express (PCIe) link, comprising:

a control register indicating virtual links will be used over the PCIe link, the control register identifying a number count for a plurality of virtual links to be used over the PCIe link, and the control register identifying a priority level for each virtual link;

a plurality of transmit queues in a PCIe root complex, each corresponding to one of the plurality of virtual links established in accordance with the control register, each virtual link having a virtual linkwidth equal to a width of active lanes of the PCIe link uniquely corresponding to a respective virtual link, wherein the PCIe link is configured in Single-Root Input/Output Virtualization (SRIOV);

transmit queue routing circuitry in the PCIe root complex configured to buffer in the transmit queues data packets received from a plurality of virtual machines; and transmit queue reading circuitry in the PCIe root complex configured to provide data from each of the transmit queues to data transmitting circuitry coupled to a plurality of active lanes of the PCIe link; wherein the transmit queue reading circuitry is configured to provide from one of the transmit queues a number of bytes of data equal to a virtual linkwidth of a respective virtual link corresponding to one of the transmit queues before providing data from another of the transmit queues.

19. The system of claim 18, wherein the transmit queue routing circuitry is configured to transfer the data packets from a virtual function associated with a respective virtual machine to the plurality of transmit queues.

20. The system of claim 19, wherein each of the virtual functions is configured to include a virtual link identifier in a transaction-layer packet (TLP) header, the virtual link identifier identifying one of the virtual links.

21. The system of claim 18, further comprising:

a plurality of receive queues in a PCIe endpoint, each corresponding to one of the virtual links and corresponding to one of the transmit queues; and receive queue routing logic configured to buffer data received by data receiving circuitry over the plurality of active lanes in the plurality of receive queues, wherein the receive queue routing logic is configured to provide to one of the receive queues a number of bytes of data equal to a virtual linkwidth of a respective virtual link corresponding to one of the receive queues before providing data to another of the receive queues.

22. The system of claim 18, wherein at least a first one of the virtual links has a higher virtual linkwidth, and a second one of the virtual links has a lower virtual linkwidth.

* * * * *